(12) United States Patent
Shibata et al.

(10) Patent No.: US 7,112,956 B2
(45) Date of Patent: Sep. 26, 2006

(54) METHOD OF GENERATING AN INDEX SIGNAL WITH REDUCED PARTS

(75) Inventors: Akira Shibata, Yamagata (JP); Yoshihito Otomo, Yamagata (JP)

(73) Assignee: Mitsumi Electric Co., Ltd., Tokyo (JP)

(*) Notice: Subject to any disclaimer, the term of this patent is extended or adjusted under 35 U.S.C. 154(b) by 300 days.

(21) Appl. No.: 10/856,195

(22) Filed: May 28, 2004

(65) Prior Publication Data

US 2004/0245957 A1 Dec. 9, 2004

(30) Foreign Application Priority Data

Jun. 2, 2003 (JP) ............... 2003-156384

(51) Int. Cl.
*G01B 7/30* (2006.01)
(52) U.S. Cl. ............ 324/207.25; 324/207.22; 324/207.2; 324/207.17; 310/68 B; 360/73.03
(58) Field of Classification Search ............ 324/207.2, 324/207.21, 207.22, 207.24, 207.25, 166, 324/173, 174, 207.15, 207.16, 207.17; 318/653, 318/560; 360/73.03; 310/68 B, 168
See application file for complete search history.

(56) References Cited

U.S. PATENT DOCUMENTS 5,400,191 A * 3/1995 Sakaguchi et al. ....... 360/73.03
5,898,301 A * 4/1999 La Croix et al. ....... 324/207.22
6,429,618 B1   8/2002 Shibata et al.
6,603,304 B1 * 8/2003 Sekine .................. 324/207.15

FOREIGN PATENT DOCUMENTS

| JP | 9-91859 A | 4/1997 |
|----|----|----|
| JP | 9-97493 A | 4/1997 |
| JP | 9-97839 A | 4/1997 |
| JP | 2000-245125 A | 9/2000 |
| JP | 2001-178185 A | 6/2001 |
| JP | 2001-184774 A | 7/2001 |
| JP | 2001-190055 A | 7/2001 |
| JP | 2003-85940 A | 3/2003 |

* cited by examiner

*Primary Examiner*—Jay M. Patidar
(74) *Attorney, Agent, or Firm*—Frishauf, Holtz, Goodman & Chick, P.C.

(57) ABSTRACT

In an index signal generator for generating an index signal for use in a direct-drive motor having a rotation axis and comprising a stator and a rotor, a particular at least one of M magnetized elements is used as an index detection magnet having magnetic force which is different from those in remaining ones of the M magnetized elements. Wound around one of a specific one of particular three cores in the stator, an index detection coil detects variations of the magnetic force generated by the ring-shaped permanent magnet to produce a detected signal. On the basis of the detected signal, the index signal is generated.

23 Claims, 22 Drawing Sheets

METHOD OF GENERATING AN INDEX SIGNAL WITH REDUCED PARTS

This application claims priority to prior application JP 2003-156384, the disclosure of which is incorporated herein by reference.

BACKGROUND OF THE INVENTION

This invention relates to an index signal generator which generates an index signal. The index signal generator is used for a disk drive that handles a recordable medium, and provides the disk drive with hardware compatibility for the same kind of disk drives. For example, a recordable medium may be a flexible disk and a disk drive may be a flexible disk drive.

In the manner which is well known in the art, the flexible disk drive (which may be hereinafter called "FDD" for short) of the type is a device for carrying out data recording and reproducing operation to and from a disk-shaped magnetic recording medium of the flexible disk (which may be hereinafter called "FD" for short or may be called "a medium") loaded therein. In addition, such a flexible disk drive is mounted or loaded in a portable electronic equipment such as a laptop personal computer, a notebook-size personal computer, a notebook-size word processor, or the like.

The flexible disk drive of the type comprises a magnetic head for reading/writing data from/to the magnetic recording medium of the flexible disk, a carriage assembly for supporting the magnetic head at a tip thereof with the magnetic head movably along a predetermined radial direction to the flexible disk, a stepping motor for moving the carriage assembly along the predetermined radial direction, and a spindle motor for rotatably driving the magnetic recording medium with the flexible disk held. The spindle motor is one of direct-drive (DD) motors.

In order to control such a flexible disk drive, an FDD control apparatus is already proposed. By way of example, Japanese Patent Application Publication (JP-A) No. H9-97493 discloses, as the FDD control apparatus, one-integrated circuit (IC) chip which incorporates first through third control circuits therein. The first control circuit is a reading/writing (hereinafter called "R/W") control circuit for controlling reading/writing of data. The second control circuit is a stepping motor (hereinafter called "STP") control circuit for controlling drive of the stepping motor. The third control circuit is a general controlling (hereinafter called "CTL") control circuit for controlling whole operation of the flexible disk drive. The CTL control circuit may be called a logic circuit. This IC chip is generally implemented by a metal oxide semiconductor (MOS) IC chip where a number of MOS field effect transistors (FETs) are integrated therein.

The FDD control apparatus comprises not only the one-IC chip but also a spindle motor IC chip for controlling drive of the spindle motor. The spindle motor IC chip is implemented by a bipolar IC chip where a number of bipolar transistors are integrated therein.

Now, flexible disk drives have different specifications due to customers or users. The specification defines, for example, drive select 0 or 1, the presence or absence of special seek function, the presence or absence of an automatic chucking function, a difference of logic for a density out signal, a difference of logic for a mode select signal, 1 M mode 250 kbps or 300 kbps, and so on. If development is made of one-IC chips which individually satisfy the different specification, a number types of one-IC chips must be prepared. In order to avoid this, a one-IC chip having a selectable function circuit is already proposed, for example, in Japanese Patent Application Publication (JP-A) No. H9-97839 wherein all functions satisfying all specifications are preliminarily incorporated therein and one of the functions is selected in accordance with a particular specification.

In the manner which is well known in the art, the flexible disk driven by the flexible disk drive includes a disk-shaped magnetic recording medium accessed by the magnetic head. The magnetic recording medium has a plurality of tracks on a surface thereof that serves as paths for recording data and that are formed in concentric circle along a radial direction. The flexible disk has eighty tracks on one side which include the most outer circumference track (which is named "$TR_{00}$" and the most inner circumference track (which is named "$TR_{79}$"). The most outer circumference track $TR_{00}$ is herein called the most end track.

It is necessary to position the magnetic head at a desired track position in a case where the flexible disk is accessed by the magnetic head in the flexible disk drive. For this purpose, the carriage assembly for supporting the magnetic head at the tip thereof must be positioned. Inasmuch as the stepping motor is used as a driving arrangement for driving the carriage assembly, it is possible for the flexible disk drive to easily carry out the positioning of the carriage assembly. In spite of this, it is necessary for the flexible disk drive to detect only the position of the most end track $TR_{00}$ in the magnetic recording medium of the flexible disk loaded therein. In order to detect the position of the most end track $TR_{00}$, the carriage assembly is provided with an interception plate which projects from a base section thereof downwards and a photointerrupter is mounted on a substrate in the vicinity of a main frame opposed to the carriage assembly. For example, see Japanese Patent Application Publication (JP-A) No. H9-91859. That is, it is possible to detect that the magnetic head is laid in the position of the most end track $TR_{00}$ in the magnetic recording medium of the flexible disk because the interception plate intercepts an optical path in the photointerrupter. Such a track position detecting mechanism is called a "00 sensor" in the art.

In the flexible disk drive where the DD (direct-drive) motor such as a spindle motor is used for rotatably driving the flexible disk, an index signal is generated on the basis of operation in periphery of a rotor of the DD motor. More specifically, a single-pole magnetized magnet (e.g. only a north pole is exposed to the outside) is provided with a peripheral side surface of a disk-shaped casing composing the rotor. Such a magnet is called an index detection magnet. In addition, on a main frame on which a stator of the DD motor and so on are mounted, a main printed wiring board on which a predetermined circuit is formed is disposed. A Hall element is located on the main printed wiring board at a predetermined position corresponding to the outside of the rotor. The Hall element is called an index detection Hall element.

Herein, the Hall element is a semiconductor element applying a Hall effect. The Hall effect is a phenomenon where an electric field occurs in a conductor in a Y-direction perpendicular to both of an X-direction and a Z-direction when the electric current flows in the X-direction in the conductor and when the magnetic field is applied in the Z-direction perpendicular to the X-direction. The electric field caused thereby is a Hall electric field and an output of the Hall element in response thereto is a Hall output.

In addition, Hall elements are used not only as the index detection Hall element but also for detecting a position in the rotor of the spindle motor. Such Hall elements are called position detection Hall elements. A spindle motor using the position detection Hall elements is called a Hall motor.

Although the Hall motor requires three position detection Hall elements, in order to omit their position detection Hall elements, proposal is made to a new motor where states of currents flowing in three-phase coils of the stator are switched on the basis of polarity of an electromotive force induced in one of the three-phase coils that is put into a high-impedance state (e.g. see Japanese Patent Application Publication (JP-A) No. 2000-245125).

In the manner which is described above, in prior art, a single-pole magnetized magnet is used as the index detection magnet. It is difficult to obtain a stable generation timing for the index signal. Accordingly, in order to obtain the stable generation timing for the index signal, the present co-inventors already proposes and files an application to use, as the index detection magnet, a double-pole magnetized magnet (that is, one where a south pole and a north pole are put side by side) (see Japanese Patent Application Publication (JP-A) No. 2001-190055). According to the proposed application, when the pole passing in front of the Hall element changes from the north pole to the south pole, a zero cross point occurs at a Hall output signal. The zero cross point is constant independent of temperature. The index signal is generated based on the zero cross point. It is therefore possible to generate the index signal at stable timing.

A conventional flexible disk drive comprises not only a main frame but also a motor frame for mounting the spindle motor for rotatably driving the medium thereon. This is because it is necessary to form a frequency generation pattern for detecting a rotation speed of the spindle motor on a printed wiring board and it is necessary to mount the printed wiring board on the motor frame. Accordingly, the conventional flexible disk drive is disadvantageous in that it requires a lot of parts and the number of processes for assembling increases. In order to resolve this problem, the present assignee has already proposed a method of controlling the rotation speed of the spindle motor without use of the frequency generation pattern (see Japanese Patent Application Publication (JP-A) No. 2001-178185) and has already proposed a flexible disk drive comprising a motor frame portion for mounting the spindle motor thereon that is constituted by one piece integrated by the main frame (see Japanese Patent Application Publication (JP-A) No. 2001-184774).

In the conventional flexible disk drive, the index detection magnet mounted on the rotor and the index detection Hall element located on the printed wiring board are disposed so that they are apart from each other at a magnetic field detection position by a little distance. The printed wiring board is disposed so as to extend in a direction normal to a rotation axis of the spindle motor. Accordingly, a conventional index detection Hall element necessarily has a magnetic detection surface which is disposed to extend in parallel with a direction of the magnetic field generated by the index detection magnet. Therefore, the conventional index detection Hall element is disadvantageous in that it has a poor sensitive condition for the magnetic field. In order to resolve this problem, the present co-inventors have already proposed a flexible disk drive which is provide with an index detection Hall element having an improved detection sensitive condition for a magnetic field (see Japanese Patent Application Publication (JP-A) No. 2003-85940). According to this proposed flexible disk drive, a motor rotatably driving a flexible disk has a rotor having an external peripheral side surface on which an index detection magnet is mounted. A main circuit board mounts a control circuit for carrying out a driving control of the motor and extends in a direction perpendicular to a rotation axis of the motor. Attached to the main circuit board, a sub circuit board extends in a direction in parallel with the rotation axis of the motor at a position close to the external peripheral side surface of the rotor. Mounted to the sub circuit board, an index detection Hall element has a magnetic field detection surface which is disposed so as to oppose to the external peripheral side surface of the rotor.

In spite of the above-mentioned improvements, a reduction in costs due to a cut of parts and reinforcement of operation stability are desired in the flexible disk drive. This is because, inasmuch as an exclusive index detection magnet and the index detection Hall element are disposed outside the external peripheral side surface of the rotor, miniaturization of the motor due to a cut of a part including the exclusive index detection magnet and the index detection Hall element is desired. In addition, reinforcement of inductance for ensure a back electromotive force in a case of coil detection with the miniaturization is also desired.

SUMMARY OF THE INVENTION

It is therefore an object of the present invention to provides an index signal generating method which is capable of cutting an exclusive index detection magnet and an index detection Hall element.

It is another object of the present invention to provide an index signal generating method of the type described, which is capable of improving operation stability by reinforcement of inductance for ensure a back electromotive force in a case of coil detection.

Other objects of this invention will become clear as the description proceeds.

On describing the gist of an aspect of this invention, it is possible to be understood that a method is for generating an index signal for use in a direct-drive motor having a rotation axis and comprising a stator and a rotor. The stator comprises N stator cores which extend radially outwardly from the rotation axis and which are disposed in one another in first equal angular intervals, where N represents a first positive integer which is multiple of three and which is not less than six. The rotor comprises a ring-shaped permanent magnet faced to an outer periphery surface of the stator with a predetermined gap. The ring-shaped permanent magnet comprises M magnetized elements which are arranged in second equal angular intervals, where M represents a second positive integer which is not less than four. The M magnetized elements alternate equally between a north pole and a south pole. According to the aspect of this invention, the above-mentioned method comprises the steps of winding (N−3) driving coils for rotatably driving the rotor around the N stator cores except for particular three cores which are arranged in equal angular intervals of 120 degrees, of using a particular at least one of the M magnetized elements as an index detection magnet, the index detection magnet having magnetic force which is different from those in remaining ones of the M magnetized elements, of winding an index detection coil around a specific one of the particular three cores, the index detection coil being for detecting variations of the magnetic force generated by the ring-shaped permanent magnet to produce a detected signal, and of generating the index signal on the basis of the detected signal.

In the above-mentioned method, the index detection magnet may have magnetic force stronger than those of the remaining ones of the M magnetized elements. In this event, the index detection magnet may desirably consist of two adjacent magnetized elements of the north pole and the south pole. The generating step may comprise the sub-steps of producing an original index signal at a zero cross point of the detected signal immediately after the detected signal exceeds a predetermined threshold value which is higher than an output signal level corresponding to the remaining ones of the M magnetized elements and which is lower than an output signal level corresponding to the index detection magnet, and of delaying the original index signal for a predetermined delay time to produce a delayed index signal as the index signal. The predetermined delay time may preferably be longer than a half period of the detected signal and be shorter than one period of the detected signal.

In the above-mentioned method, the index detection magnet may have magnetic force weaker than those of the remaining ones of the M magnetized elements. The index detection magnet may have no magnetic force. In this event, the index detection magnet may desirably consist of two adjacent magnetized elements of the north pole and the south pole. The generating step may comprise the sub-steps of processing the detected signal to produce a processed signal, the processed signal having a leading edge at a zero cross point of the detected signal immediately after the detected signal exceeds to a predetermined positive threshold value and a trailing edge at a zero cross point of the detected signal immediately after the detected signal lowers than a predetermined negative threshold value, of inverting the processed signal to produce an inverted signal, of delaying a leading edge of the inverted signal for a predetermined delay time to produce a delayed signal, the predetermined delay time being longer than a half period of the detected signal and being shorter than one period of the detected signal, and of ANDing the inverted signal and the delayed signal to produce an ANDed signal as the index signal.

Alternatively, the index detection magnet may consist of only one magnetized element selected from the north pole and the south pole. In this event, the generating step preferably may comprise the sub-steps of processing the detected signal to produce a processed signal, the processed signal having a leading edge at a zero cross point of the detected signal immediately after the detected signal exceeds to a predetermined positive threshold value and a trailing edge at a zero cross point of the detected signal immediately after the detected signal lowers than a predetermined negative threshold value, of delaying a leading edge of the processed signal for a predetermined delay time to produce a delayed signal, the predetermined delay time being longer than a half period of the detected signal and being shorter than one period of the detected signal, and of ANDing the processed signal and the delayed signal to produce an ANDed signal as the index signal. Preferably, the method may further comprise the step of winding two coils around the particular three cores except for the specific one thereof. The two coils are supplied with no driving current.

On the gist of another aspect of this invention, it is possible to be understood that an index signal generator is for generating an index signal for use in a direct-drive motor having a rotation axis and comprising a stator and a rotor. The stator comprises N stator cores which extend radially outwardly from the rotation axis and which are disposed in one another in first equal angular intervals, where N represents a first positive integer which is multiple of three and which is not less than six, and (N−3) driving coils wound around the N stator cores except for particular three cores which are arranged in equal angular intervals of 120 degrees. The rotor comprises a ring-shaped permanent magnet faced to an outer periphery surface of the stator with a predetermined gap. The ring-shaped permanent magnet comprises M magnetized elements which are arranged in second equal angular intervals, where M represents a second positive integer which is not less than four. The M magnetized elements alternate equally between a north pole and a south pole. According to the other aspect of this invention, the above-mentioned index signal generator comprises an index detection magnet being a particular at least one of the M magnetized elements. The index detection magnet has magnetic force which is different from those in remaining ones of the M magnetized elements. Wound around a specific one of the particular three cores, an index detection coil is for detecting variations of the magnetic force generated by the ring-shaped permanent magnet to produce a detected signal. Generating means is for generating the index signal on the basis of the detected signal.

In the above-mentioned index signal generator, the index detection magnet may have magnetic force stronger than those of the remaining ones of the M magnetized elements. In this event, the index detection magnet desirably may consist of two adjacent magnetized elements of the north pole and the south pole. The generating means may comprise producing means for producing an original index signal at a zero cross point of the detected signal immediately after the detected signal exceeds a predetermined threshold value which is higher than an output signal level corresponding to the remaining ones of the M magnetized elements and which is lower than an output signal level corresponding to said index detection magnet. Delaying means is for delaying the original index signal for a predetermined delay time to produce a delayed index signal as the index signal. The predetermined delay time may be longer than a half period of the detected signal and being shorter than one period of the detected signal.

In the above-mentioned index signal generator, the index detection magnet may have magnetic force weaker than those of the remaining ones of the M magnetized elements. For example, the two adjacent magnetized elements of the index detection magnet may be in contact with each other at a contact surface inclined to a moving direction of the rotor, and adjacent two in the remaining magnetized elements of the ring-shaped permanent magnet may be in contact with each other at a contact surface perpendicular to the moving direction of the rotor. The index detection magnet may have no magnetic force. In this event, the index detection magnet desirably may consist of two adjacent magnetized elements of the north pole and the south pole. The generating means may comprise processing means for processing the detected signal to produce a processed signal, the processed signal having a leading edge at a zero cross point of the detected signal immediately after the detected signal exceeds a predetermined positive threshold value and a trailing edge at a zero cross point of the detected signal immediately after the detected signal lowers than a predetermined negative threshold value, inverting means for inverting the processed signal to produce an inverted signal, delaying means for delaying a leading edge of the inverted signal for a predetermined delay time to produce a delayed signal, the predetermined delay time being longer than a half period of the detected signal and being shorter than one period of the detected signal, and an AND circuit for ANDing the inverted signal and the delayed signal to produce an ANDed signal as the index signal.

Alternatively, the index detection magnet may consist of only one magnetized element selected from the north pole and the south pole. In this event, the generating means may comprise processing means for processing the detected signal to produce a processed signal, the processed signal having a leading edge at a zero cross point of the detected signal immediately after the detected signal exceeds a predetermined positive threshold value and a trailing edge at a zero cross point of the detected signal immediately after the detected signal lowers than a predetermined negative threshold value, delaying means for delaying a leading edge of the processed signal for a predetermined delay time to produce a delayed signal, the predetermined delay time being longer than a half period of the detected signal and being shorter than one period of the detected signal, and an AND circuit for ANDing the processed signal and the delayed signal to produce an ANDed signal as the index signal. Preferably, the index signal generator further comprises two coils wound around the particular three cores except for the specific one thereof. The two coils are supplied with no driving current.

DESCRIPTION OF THE PREFERRED EMBODIMENTS

Figure 1:
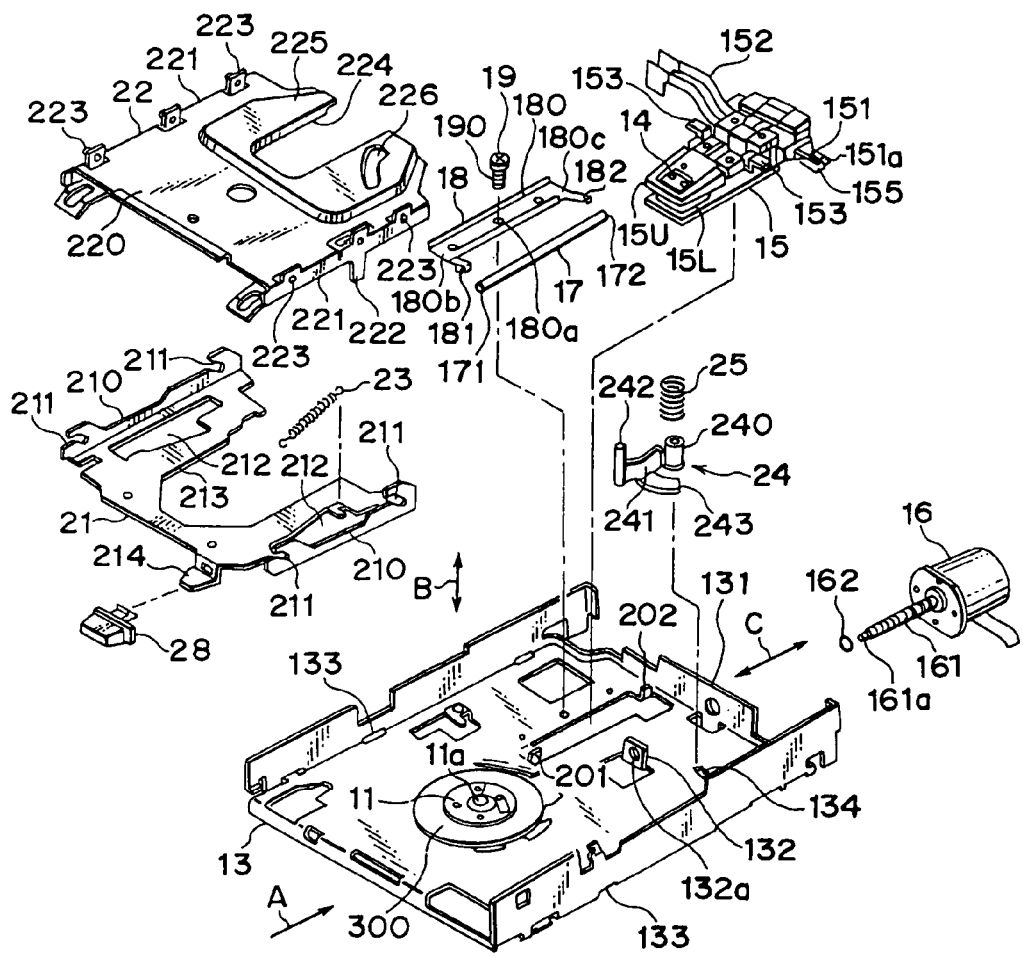
FIG. 1 is an exploded perspective view showing a main part of a conventional flexible disk drive.
Figure 2:
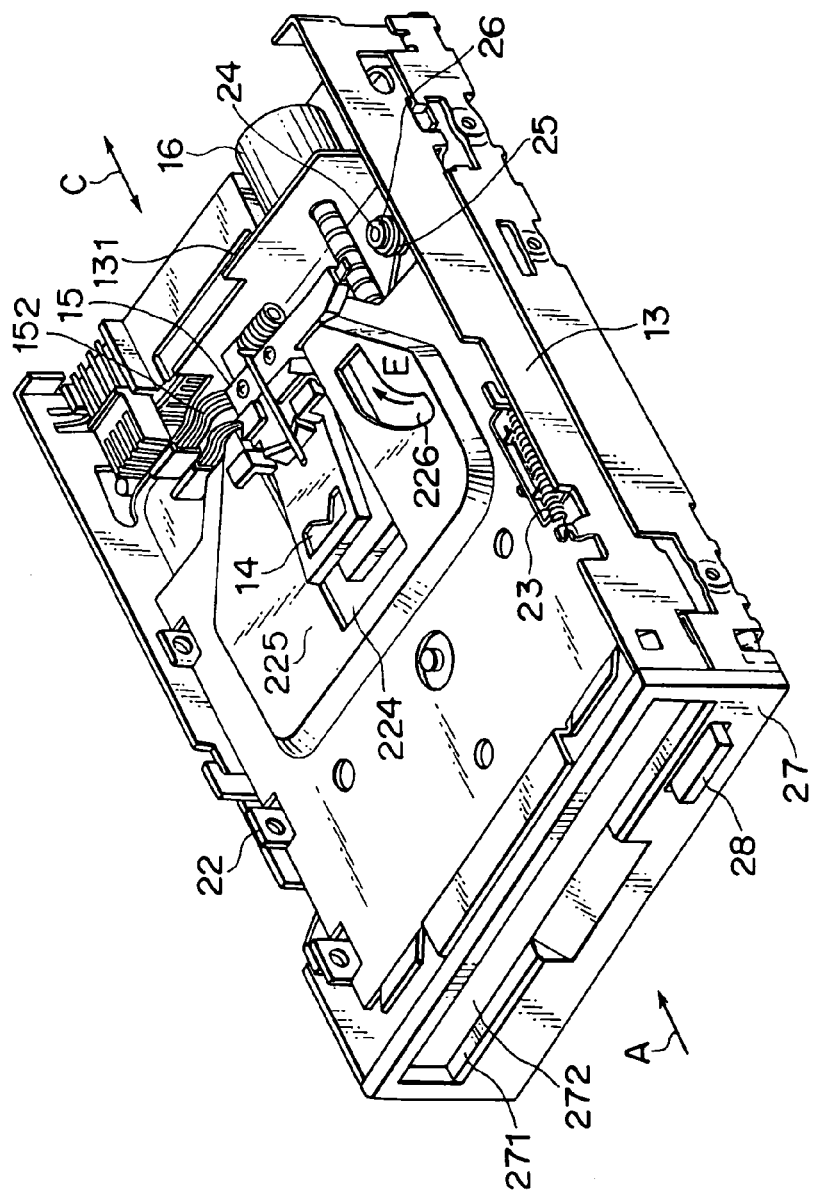
FIG. 2 is a schematic perspective view of the flexible disk drive illustrated in FIG. 1 as view from front obliquely.

Referring to FIGS. 1 and 2, a conventional flexible disk drive of a 3.5-inch type will be described at first in order to facilitate an understanding of the present invention. FIG. 1 is an exploded perspective view of the conventional flexible disk drive. Although the conventional flexible disk drive has a front panel and a case, they are omitted in FIG. 1. FIG. 2 is a perspective view of the conventional flexible disk drive viewing from a front side. An upper cover (the case) is omitted in FIG. 2.

The illustrated flexible disk drive is a device for driving a flexible disk of a 3.5-inch type (which will later be described). The flexible disk is loaded or inserted in the flexible disk drive from a direction indicated by an arrow A in FIGS. 1 and 2. The loaded flexible disk is held on a disk table 11 having a rotation axis 11a. In this event, the rotation axis 11a coincides with a center axis of the flexible disk. In the manner which will later be described, the disk table 11 is rotatably supported on a frame main surface of the main frame 13. Accordingly, the rotation axis 11a of the disk table 11 has an axial direction B which extends in parallel with a thick direction of the main frame 13. The disk table 11 is rotatably driven by a spindle motor or a direct-drive (DD) motor 300, which is mounted on a concave portion of the main frame 13 in the manner which will later be described, thereby a magnetic recording medium of the flexible disk rotates. In addition, on a frame back surface of the main frame 13 is attached a main printed wiring board (not shown) on which a number of electric parts (not shown) are mounted.

The flexible disk drive comprises a pair of upper and lower magnetic heads 14 (only the upper magnetic head is illustrated) for reading/writing data from/to the magnetic recording medium of the flexible disk. The magnetic heads 14 are supported in a carriage assembly 15 at a tip thereof that is laid in the flexible disk drive at a rear side. That is, the carriage assembly 15 comprises an upper carriage 15U for supporting the upper magnetic head 14 and a lower carriage 15L for supporting the lower magnetic head. The carriage assembly 15 is disposed over the frame main surface of the main frame 13 and is apart from the main frame 13 in the manner which will later be described. The carriage assembly 15 supports the magnetic heads 14 at the tip thereof movably along a predetermined radial direction (i.e. a direction indicated by an arrow C in FIGS. 1 and 2) to the flexible disk.

In addition, the main frame 13 has at the rear side a side wall 131 on which a stepping motor 16 is fixed. The stepping motor 16 linearly drives the carriage assembly 15 along the predetermined radial direction C. More specifically, the stepping motor 16 has an axis of rotation (a driving shaft) 161 which extends in parallel with the predetermined radial direction C and which is threaded to form a male screw. The driving shaft 161 has a tip 161a which penetrates a hole 132a bored in a bent piece 132 and which is provided with a steel ball 162. The bent piece 132 is raised from the frame main surface of the main frame 13 by cutting and bending. By the hole 132a and the steel ball 162, a position of the driving shaft 161 is defined so as to extend in parallel with the predetermined radial direction C and the tip 161a is rotatably held.

On the other hand, the carriage assembly 15 comprises an arm 151 which extends from the lower carriage 15L to the driving shaft 161. The arm 151 has a leading edge 151a which engages with the root in the male screw of the driving shaft 161. A spring 155 extends from the lower carriage 15L in substantially parallel with the arm 151. That is, the driving shaft 161 of the stepping motor 16 is put between the arm 151 and the spring 155.

Therefore, when the driving shaft 161 of the stepping motor 16 rotates, the leading edge 151a of the arm 151 moves along the root in the male screw of the driving shaft 161, thereby moving the carriage assembly 15 along the predetermined radial direction C. At any rate, the stepping motor 16 serves as a driving arrangement for linearly moving the carriage assembly 15 along the predetermined radial direction C.

Inasmuch as the driving shaft 161 of the stepping motor 16 is disposed at one side of the carriage assembly 15, the one side of the carriage assembly 15 is movably supported by the driving shaft 161 and is apart from the frame main surface of the main frame 13. However, because support occurs by the driving shaft 161, it is difficult to dispose the whole of the carriage assembly 15 apart from the frame main surface of the frame 13. For this purpose, a guide bar 17 supports and guides the carriage assembly 15 at another side thereof. The guide bar 17 is opposed to the driving shaft 161 of the stepping motor 16 with the carriage assembly 15 inserted between the guide bar 17 and the driving shaft 161. The guide bar 17 extends in parallel with the predetermined radial direction C and has one end 171 and another end 172 which are mounted on the frame main surface of the main frame 13 in the manner which later be described. The guide bar 17 guides the carriage assembly 15 along the predetermined radial direction C. As a result, the whole of the carriage assembly 15 is disposed apart from the frame main surface of the main frame 13.

In addition, a flexible printed circuit (FPC) 152 extends from the carriage assembly 15 to the vicinity of the guide bar 17 and the flexible printed circuit 152 are electrically connected to the main printed wiring board (which will later be described) attached to the frame back surface of the main frame 13.

The guide bar 17 is clamped on the frame main surface of the main frame 13 by a guide bar clamp 18. The guide bar clamp 18 is fixed on the frame main surface of the main frame 13 at a center portion thereof by a binding small screw 19. More specifically, the guide bar clamp 18 comprises a rectangular fixed member 180 having a length longer than that of the guide bar 17 by a short distance. In about the center of the rectangular fixed member 180, a hole 180a is drilled through which a screw shaft 190 of the binding small screw 19 passes. The rectangular fixed member 180 has one end 180b and another end 180c from which a pair of arms 181 and 182 extend to clamp the one end 171 and the other end 172 of the guide bar 17 which the guide bar 17 sandwiched between the arms 181 and 182, respectively.

Inasmuch as the guide bar clamp 18 merely clamps the guide bar 17, the guide bar 17 cannot be fixed on the frame main surface of the main frame 13 by the guide bar clamp 18 alone. For this purpose, a pair of locating members for collating the both ends 171 and 172 of the guide bar 17 is needed. As the pair of locating members, a pair of bent pieces 201 and 202 is used which are formed by cutting and bending parts of the main frame 13.

The lower carriage 15L of the carriage assembly 15 serves as a supporting frame for supporting the carriage assembly 15 slidably along the guide bar 17. The lower carriage 15L has a projecting portion (not shown) which projects into the frame main surface of the main frame 13 at a side of the guide bar 17. The guide bar 17 is slidably fitted in the projection portion.

The flexible disk drive further comprises an eject plate 21 and a disk holder 22. Each of the main frame 13, the eject plate 21, and the disk holder 22 is formed by performing bending, press working, and bending of a metal plate.

The eject plate 21 is mounted on the frame main surface of the main frame 13 slidably along the insertion direction A of the flexible disk and an opposite direction. In the manner which will later become clear, the eject plate 21 holds, in cooperation with the disk holder 22, the flexible disk on operating of the flexible disk drive. In addition, the eject plate 21 holds the flexible disk slidably along in the insertion direction A so at to allow the flexible disk drive to load the flexible disk therein along the insertion direction A and to allow the flexible disk drive to eject the flexible disk therefrom along the opposite direction. The eject plate 21 comprises a pair of side walls 210 which are opposite to each other. Each of the side walls 210 has a pair of cam portions 211. In addition, the eject plate 21 has a bottom surface on which cut portions 212 are formed along the both side walls 210 and a U-shaped cut portion 213 is formed at a center portion thereof so as to enclose the disk table 11. Furthermore, the eject plate 21 has a back surface on which a pin (not shown) is formed. The pin engages with a stop part of an eject lever which will later be described.

The disk holder 22 is disposed on the eject plate 21. The disk holder 22 comprises a principal surface 220 and a pair of side walls 221 which is formed at both side ends of the principal surface 220 and which is opposed to each other. The both side walls 221 have projection pieces 222 (only one is illustrated). The projection pieces 222 are inserted in bores 133 of the main frame 13 through the cut portions 212 of the eject plate 21. Inasmuch as the projection pieces 222 are inserted in the bores 133 of the main frame 13, the disk holder 22 is positioned against the main frame 13 in the insertion direction A and the disk holder 22 is reciprocated in the axial direction B of the rotation axis 11a of the disk table 11. Each of the both side walls 221 has a pair of pins 223. The pins 223 are inserted in the cam portions 211 formed in the side walls 210 of the eject plate 21. Between the disk holder 22 and the eject plate 21, eject springs 23 bridge.

Although the disk holder 22 is provided with the projection pieces 22 and the bores 133 are formed in the main frame 13 in this example, restriction is not made to this and the main frame 13 may be provided with projection pieces and bores may be formed in the disk holder 22.

In addition, the disk holder 22 has a rectangular opening section 224 at a center portion in a back side in the insertion direction A. The rectangular opening section 224 is laid in a corresponding position of the upper carriage 15U of the carriage assembly 15 and extends in the predetermined radial direction C. So as to enclose the opening section 224, a U-shaped swelled portion 225 is formed where the principal surface 220 of the disk holder swells at periphery upwards. On the other hand, the carriage assembly 15 comprises longitudinal direction of the carriage assembly 15. The side arms 153 are located on or over the swelled portion 225. In the manner which will later be described, in a state where the flexible disk is ejected from the disk holder 22, the side arms 153 engages with the swelled portion 225, thereby the pair of upper and lower magnetic heads 14 are apart from each other. In addition, the disk holder 22 has an additional opening section 226 at a right-hand side of the opening section 224 in the back side of the insertion direction A. The opening section 226 has a shape so as to allow a lever part of the eject lever (which will later be described) rotatably move.

In the vicinity of the carriage assembly 15 on the main frame 13, the eject lever depicted at 24 is formed to rotatably move. More specifically, on the main frame 13, a rod pin 134 stands up which extends from the frame main surface thereof upwards. The eject lever 24 comprises a cylindrical part 240 in which the rod pin 134 is inserted, an arm part (the lever part) 241 extending from the cylindrical part 240 in a radial direction, a projection part 242 which is formed in the arm part 241 at a free end thereof and which extends upwards, and an arc-shaped stop part 243 which extends from a side of the free end of the arm part 241 in a circumferential direction. In the eject lever 24, an eject lever spring 25 is attached around the cylindrical part 240 and the eject lever spring 25 urges the eject lever 24 in a counterclockwise direction on a paper of FIG. 1. The projection part 242 of the eject lever 24 is freely fitted in the opening section 226 of the disk holder 22. The projection part 242 is engaged with an upper end of a right-hand side edge of a shutter in the flexible disk, that will later be described, to control opening and shutting of the shutter. In addition, as shown in FIG. 2, a screw 26 is thrust into a tip of the rod pin 134, thereby preventing the eject lever 24 from falling off the rod pin 134.

In addition, the main frame 13 has a front end section on which a front panel 27 is attached. The front panel 27 has an opening 171 for taking the flexible disk in and out and a door 272 for opening and shutting the opening 271. Into the front panel 27, an eject button 28 projects movably backward and forward. The eject button 28 is fitted in a protrusion part 214 which protrudes from a front end of the eject plate 21 forwards.

Figure 3:
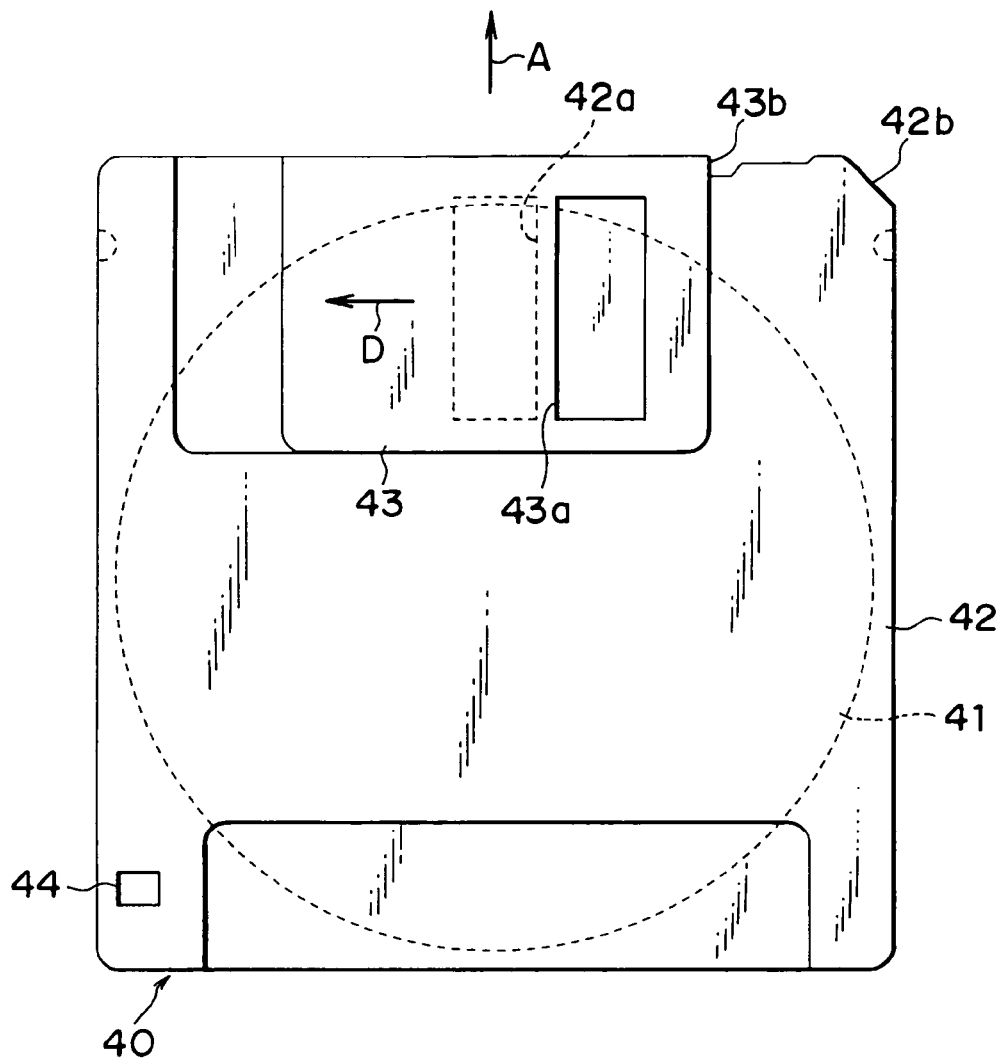
FIG. 3 is a plan view showing a flexible disk drive by the flexible disk drive.

Referring to FIG. 3, the description will proceed to the flexible disk (FD) driven by the flexible disk drive (FDD) illustrated in FIGS. 1 and 2. The illustrated flexible disk depicted at 40 comprises a disk-shaped magnetic recording medium 41, a shell 42 for covering or receiving the magnetic recording medium 41, and the shutter depicted at 43 slidably in a direction indicated by an arrow D in FIG. 3. The shutter 43 has a shutter window 43a. The shutter 43 is urged by a spring member (not shown) in a direction reverse to the direction D. The shell 42 has a head window 42a to enable an access of the magnetic recording medium 41 by the magnetic heads 14 (FIGS. 1 and 2) of the flexible disk drive. In a state where the flexible disk 40 is not loaded in the flexible disk drive, the head window 43a is covered by the shutter 43 as shown in FIG. 3. When the flexible disk 40 is loaded in the flexible disk drive, the projection part 242 of the eject lever 42 (FIG. 1) engages with the upper end 43b of the right-hand side edge of the shutter 43 to slide the shutter 43 in the direction depicted at the arrow D.

The shell 42 has a chamfered portion 42b at a corner portion in upper and right-hand side. The chamfered portion 42b is for preventing reverse insertion (wrong insertion in a vertical direction or the insertion direction A). In addition, a write protection hole 44 is bored in the shell 42 at a corner portion in rear and left-hand side in the insertion direction A of FIG. 3.

As described above, in the flexible disk 40 driven by the flexible disk drive, the magnetic recording medium 41 accessed by the magnetic heads 14 (FIGS. 1 and 2) has a plurality of tracks on a surface thereof that serves as paths for recording data and that are formed in a concentric circle along a radial direction. The flexible disk 40 has eighty tracks one side which includes the most outer circumference track (the most end track) $TR_{00}$ and the most inner circumference track $TR_{79}$.

Figure 4:
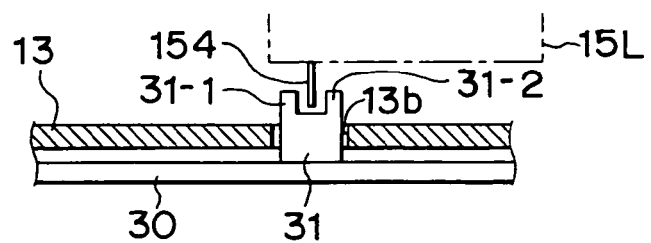
FIG. 4 is a sectional view for use in describing a set-up structure of a track position detecting mechanism (00 sensor) used in the flexible disk drive.

Referring to FIG. 4 in addition to FIG. 1, the description will proceed to a track position detection mechanism (a 00 sensor) for detecting a position of the most end track $TR_{00}$ of the magnetic recording medium 41.

In the carriage assembly 15, the lower carriage 15L is provided with an interception plate 154 which projects from a base section thereof downwards. On the other hand, the main printed wiring board 30 is disposed on the frame back surface of the main frame 13 opposed to the carriage assembly 15. On the main printed wiring board 30, a photointerrupter 31, which is used as the track position detecting mechanism (the 00 sensor), is mounted. For this purpose, the main frame 13 has a bore 13b in which the photointerrupter 31 is inserted.

In the manner which is well known in the art, the photointerrupter 31 comprises a first protrusion section 31-1 into which a light-emitting element (not shown) is built and a second protrusion section 31-2 into which a light-receiving element (not shown) is built. The first protrusion section 31-1 and the second protrusion section 31-2 are opposed to each other at two opposite wall surfaces which have tow opening sections (not shown), as shown in FIG. 4. Through the two opening sections, an optical path is formed to go from the light-emitting element to the light-receiving element. In addition, the above-mentioned interception plate 154 passes through a path between the first protrusion section 31-1 and the second protrusion section 31-2.

In the 00 sensor with such a structure, it is possible to detect that the magnetic heads 14 (FIGS. 1 and 2) are laid in the position of the most end track TR00 in the magnetic recording medium 41 of the flexible disk 40 because the interception plate 154 intercepts the optical path in the photointerrupter 31.

Figure 5:
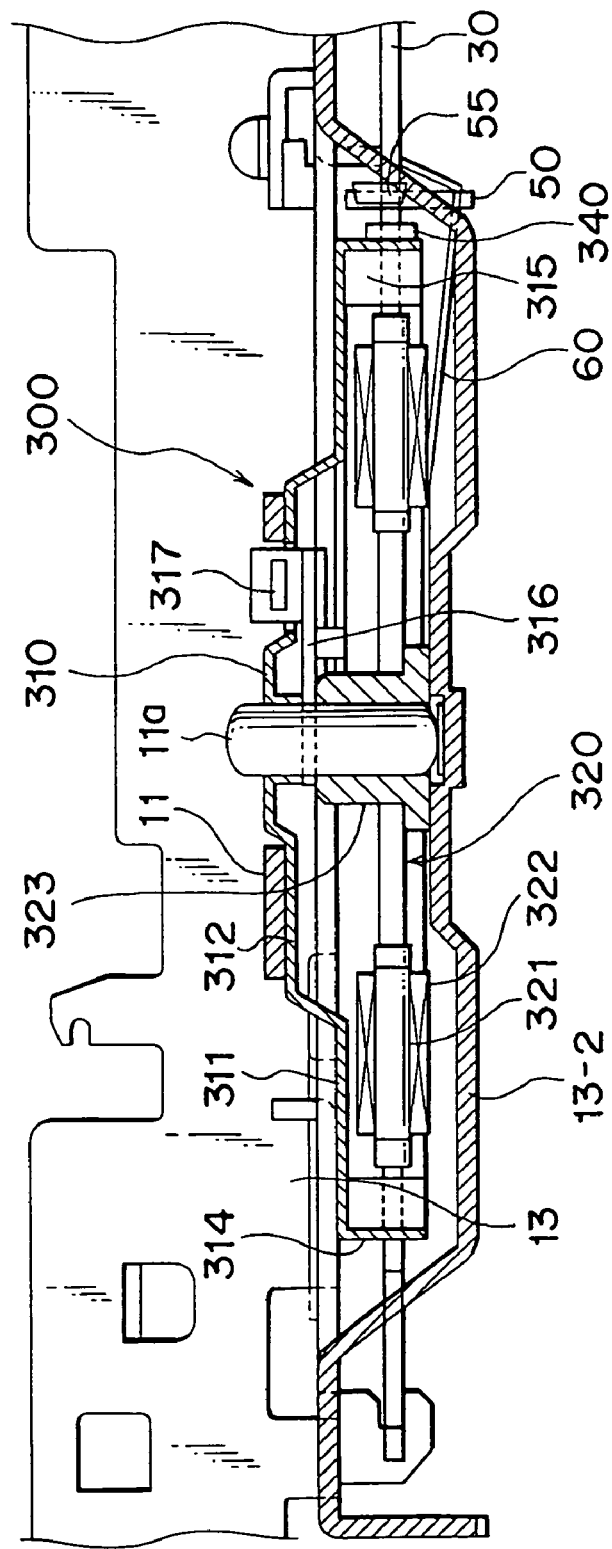
FIG. 5 is a sectional view showing a conventional direct-drive motor (spindle motor) mounted thereon in the flexible disk drive illustrated in FIG. 1.

Referring to FIG. 5, the description will proceed to the DD motor (spindle motor) 300 for use in the above-mentioned flexible disk drive.

The illustrated DD motor 300 has a rotation axis 11a and comprises a rotor 310 and a stator 320 combined with the rotor 310. The rotor 310 comprises a disk-shaped metallic casing 311 which has a protruding portion 312 formed at its center to protrude upward. The protruding portion 312 has an upper surface on which the above-mentioned disk table 11 is mounted.

The rotation axis or shaft 11a made of metal is integrally fixed to the rotor 310 at the center thereof to pass through the casing 311 and the disk table 11. When the disk table 11 is injection-molded by the use of a plastic magnet, the casing 311 and the rotation shaft 11a are integrally assembled. The casing 311 has a cylindrical member 314 formed on its outer periphery to extend downward. A ring-shaped permanent magnet 315 is attached to an inner surface of the cylindrical member 314.

The ring-shaped permanent magnet 315 has a plurality of main magnetized elements along a circumferential direction thereof. The main magnetized elements are called driving magnetized portions.

In addition, as shown in FIG. 5, an index detection magnet 340 is put on an outer circumferential wall of the cylindrical member 314 at a predetermined position.

The protruding portion 312 is provided with an arm 316 attached to a bottom surface thereof. A driving roller 317 is rotatably mounted on the arm 316. Each of the protruding portion 312 and the disk table 11 has a generally rectangular hole formed therein. Through these holes, the drive roller 317 projects upward from the disk table 11. The flexible disk 40 (FIG. 3) received in the flexible disk drive is placed on the disk table 11. The drive roller 317 is inserted in and engaged with a hole (not shown) formed in a hub (not shown) of the flexible disk 40. Thus, the magnetic disk medium 41 (FIG. 3) is rotated following the rotation of the rotor 310.

On the other hand, the stator 320 is attached to a motor frame part 13-2 of the main frame 13 in the manner which will later be described. The stator 320 comprises a core assembly having a plurality of stator cores 321, a plurality of stator coils 322, and s center metal (bearing unit) 323. Each of the stator core 321 extends radially outwardly from an outer periphery of a ring-shaped member of the center metal 323. Each of stator coils 322 is wound around an end portion of each corresponding stator core 321. The center metal 323 is formed at the center of the DD motor 300 and rotatably supports the rotation shaft 11a.

In general, the stator 320 comprises N stator cores 321, where N represents a first positive integer which is multiple of three and which is not less than six. The N stator cores 321 extend radially outwardly from the rotation axis 11a. The N stator cores 321 are disposed in one another in first equal angular intervals. The ring-shaped permanent magnet 315 is faced to an outer periphery surface of the stator 320 with a predetermined gap. The ring-shaped permanent magnet 315 comprises M magnetized elements which are arranged in second equal angular intervals, where M represents a second positive integer which is not less than four. The M magnetizes elements alternate equally between a north pole and a south pole.

Figure 6:
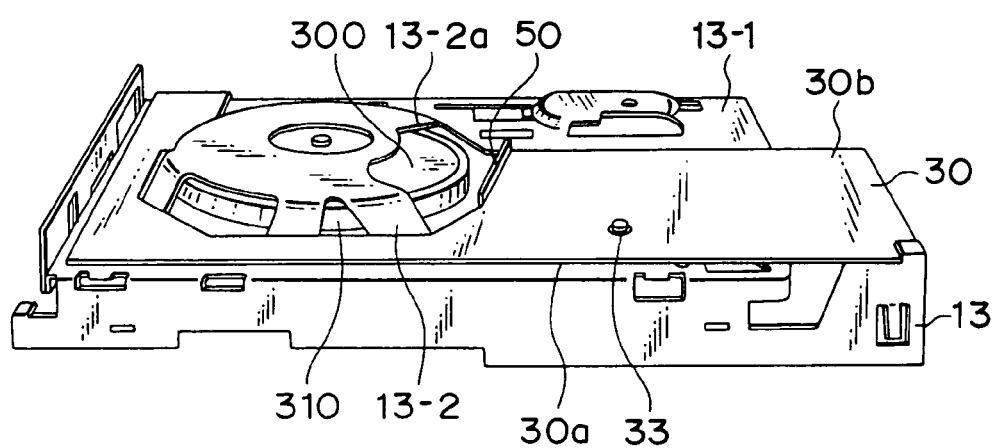
FIG. 6 is a schematic perspective view of a state where a main printed wiring board and a sub printed wiring board are mounted on a main frame for use in the conventional flexible disk drive as seen from the obliquely lower lateral side.

Referring to FIG. 6, the description will proceed to a frame structure (the main frame) 13 for use in the flexible disk drive illustrated in FIGS. 1 and 2. FIG. 6 is a schematic perspective view of the main frame 13 as view from lower side obliquely.

In the manner as apparent from FIG. 6, the illustrated main frame (frame structure) 13 is composed of one piece in which the main frame part 13-1 and a motor frame part 13-2 are integrated. The main frame part 13-1 is made of magnetic material. The flexible disk 40 (FIG. 3) is inserted or loaded in the main frame part 13-1. The spindle motor 300 for rotatably driving the inserted flexible disk is mounted on the motor frame part 13-2. That is, the main frame 13 serves both as an original main frame and an original motor frame.

The motor frame part 13-2 has a drawn-shape obtained by drawing the main frame 13. The motor frame part 13-2 protrudes into the back side of the main frame 13 to form a top surface which is a part of the frame back surface of the main frame 13. In the top surface of the motor frame part 13-2, an opening window 13-2a for drawing out leads of the spindle motor 300 is formed.

In addition, although the drawn-shape of the motor frame part 13-2 illustrated in FIG. 6 is a circular shape, it is not restricted to this and may be a polygonal shape or an oval shape in response to depth or material of the motor frame part 13-2. In addition, a drawing shirked shape in the drawn-shape of the motor frame part 13-2 is also not restricted to that illustrated in FIG. 6 and may be various shapes. Furthermore, a connection way between the motor frame part 13-2 and the main frame part 13-1 is also not restricted to that illustrated in FIG. 6.

The illustrated flexible disk drive can adopt the main frame 13 having the above-mentioned shape because the flexible disk drive does not have a frequency generation pattern which is necessary to control driving of the spindle motor 300 and a printed wiring board on which the frequency generation pattern is formed. Moreover, motor-servo magnetized elements formed at the bottom portion of the permanent magnet 315 of the rotor 310 are unnecessary because the flexible disk drive does not have the frequency generation pattern. Instead, the flexible disk drive comprises an electronic processing unit which functions as a combination of the frequency generation pattern and the motor-servo magnetized elements. Operation of the electronic processing unit is similar to that described in the above-mentioned Japanese Patent Application Publication (JP-A) No. 2001-178185. Inasmuch as the electronic processing unit only indirectly relates to this invention, the description thereof is omitted herein.

The main printed wiring board 30 of the illustrated flexible disk drive is attached to the frame back surface of the main frame part 13-1 of the main frame 13. As shown in FIG. 6, the main printed wiring board 30 has a shape such as to avoid overlapping with the motor frame part 13-2. The main frame part 13-1 has a supporting piece (not shown) which is raised from the frame back surface of the main frame part 13-1 by cutting and bending and which has a threaded hole formed in its tip portion. The main printed wiring board 30 is fixed to the supporting piece by a screw 33 engaged with the threaded hole so that a main surface 30a of the main printed wiring board 30 is spaced at a predetermined distance from the frame back surface of the main frame part 13-1 and a back surface 30b of the main printed wiring board 30 is nearer to the frame back surface of the main frame part 13-1 than the top surface of the motor frame part 13-2.

Figure 7:
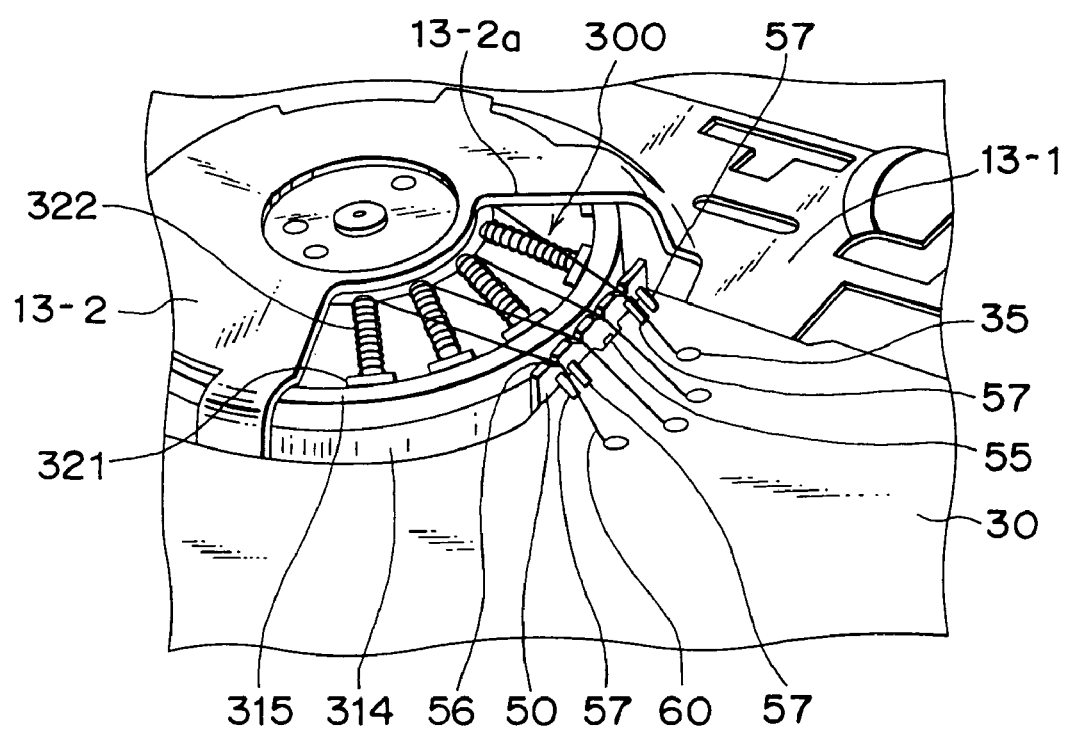
FIG. 7 is a view showing a sate where leads are put on ditches of the sub printed wiring board illustrated in FIG. 6.

Referring to FIG. 7 in addition to FIG. 6, on the side of the frame main surface of the main frame 13, end portions (i.e. leads) of rotor coils wound around stator cores of the spindle motor 300 mounted on the motor frame part 13-2 are drawn out to the back side of the main frame 13 through the opening window 13-2a formed in the motor frame part 13-2 and are connected to predetermined terminals on the main printed wiring board 30. Generally, the leads 60 are equal in number to four. Three of the leads 60 correspond to U, V and W phases of three-phase alternating current. The remaining one of the leads 60 is connected to the other ends of the leads of the U, V and W phases. The illustrated flexible disk drive further comprises a sub printed wiring board (a sub circuit board) 50. The sub printed wiring board 50 is for guiding the leads 60. On the sub printed wiring board 50, an index detection Hall element 55 is mounted.

The main printed wiring board 30 extends in a direction perpendicular to the rotation axis 11a of the spindle motor 300. On the other hand, the sub printed wiring board 50 is attached to the main printed wiring board 30 at a position close to an external peripheral side of the rotor 310 of the spindle motor 300 so as to extend in a direction in parallel with the rotation axis 11a of the spindle motor 300.

In addition, the index detection Hall element 55 is attached on the sub printed wiring board 50 so that a magnetic field detection surface thereof is opposed to the external peripheral side surface of the rotor 310. In addition, the index detection Hall element 55 has four terminals (not shown) which are electrically connected to wiring (not shown) in the main printed wiring board 30 via solder 57. The solder 57 plays not only a role of such an electrical connection but also a role of a mechanical connection between the main printed wiring board 30 and the sub printed wiring board 50.

Drawn out from the opening window 13-2a, the leads 60 are held and fixed on the sub printed wiring board 50 with the leads 60 put on ditches 56 of the sub printed wiring board 50. The leads 60 have tips which are connected and fixed to predetermined terminals 35 of the main printed wiring board 30.

Figure 8:
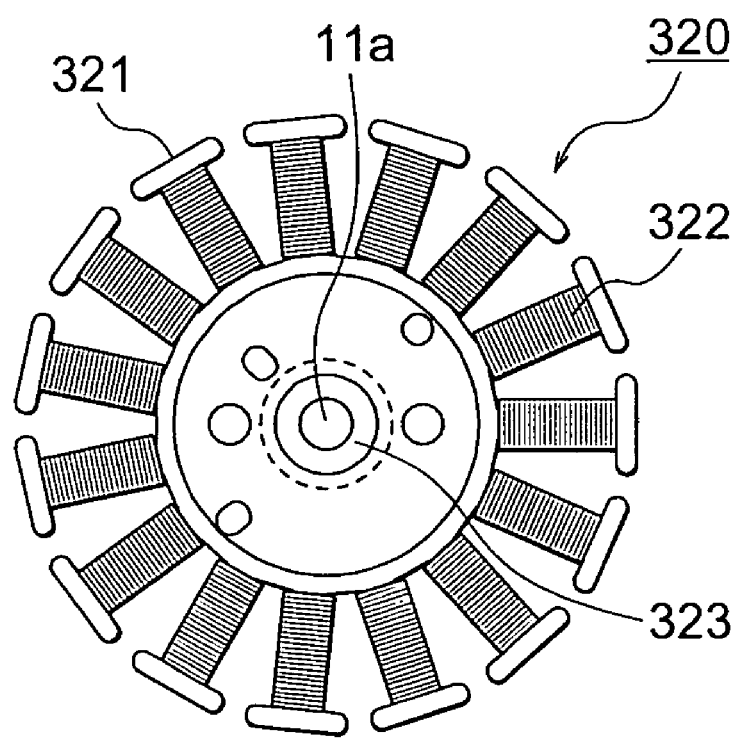
FIG. 8 is a plan view showing a conventional stator for use in the direct-drive motor illustrated in FIG. 5.

FIG. 8 shows a conventional stator 320 of the DD motor illustrated in FIG. 5. In the manner which is described above, the stator 320 comprises the core assembly having the N stator cores 321, the N stator coils 322, and the center metal (bearing unit) 323. Each of the N stator cores 321 extends radially outwardly from the outer periphery of the ring-shaped member of the center metal 323. Each of the stator coils 322 is wound around the end portion of each corresponding stator core 321. The center metal 323 is formed at the center of the DD motor 300 (FIG. 5) and rotatably supports the rotation shaft 11a.

The stator coils 322 are called driving coils. Specifically, the N stator cores 321 are disposed in one another in the first equal angular intervals and extend radially outwardly from a center axis of the rotation shaft 1a. In the example being illustrated, the N stator cores 321 are equal in number to fifteen or the first positive integer is equal to fifteen. Each driving coil 322 is wound around each corresponding stator core 321.

Figure 9:
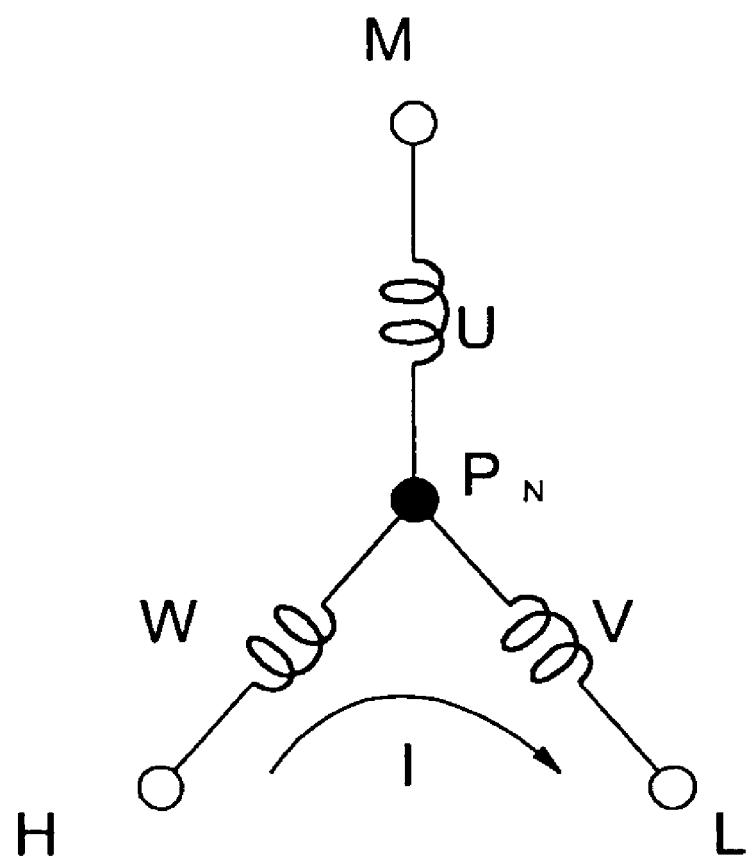
FIG. 9 is a view showing a state of an electric current flowing three-phase coils.

As shown in FIG. 9, the N driving coils 322 are operable as three-phase coils of U-phase, V-phase, and W-phase which are connected to each other at a neutral point $P_N$ or a common connection terminal. The connection is called as star connection or Y-connection. The three-phase coils of U-phase, V-phase, and W-phase are hereinafter called a U-phase coil, a V-phase coil, and a W-phase coil, respectively. In FIG. 9, the coil, which the electric current (I) flows into, is depicted with the reference letter "H," while the coil, which the electric current (I) flows out of, is depicted with "L." In the illustrated example, electric current (I) flows into the W-phase coil and flows out of the V-phase coil. The coil depicted with the reference letter "H" is called a source coil, while the coil depicted with the reference letter "L" is called a sink coil. In the illustrated example, the W-phase coil is the source coil, while the V-phase coil is the sink coil. In addition, a state of the coil, which the electric current (I) neither flows in nor flows out, is called a high-impedance state, and the coil is depicted with the reference letter "M". In the illustrated example, the U-phase coil is put into the high-impedance state or "M" state.

As described above, among the three-phase coils, one of coils is put into the "H" state, another one is put into the "L" state, and the remaining one is put into the "M" state. There are six ways to flow the electric current (I) into the three-phase coils.

As shown in FIG. 5, the rotor 310 of the DD motor 300 comprises the ring-shaped permanent magnet 315 which is repeatedly magnetized in a circumferential direction. The ring-shaped permanent magnet 315 is equivalent to the M magnetized elements which are arranged in the second equal angular intervals to form the ring. That is, the M magnetized elements alternate equally between a north pole and a south pole. As described above, the stator 320 comprises the N stator cores 321, where the N driving coils 322 are wound. Provided that the number of the magnetic elements and the number of the poles 321 of the stator 320 are represented by M and N, respectively, a ratio M:N is equal to 4:3 in this example.

If the number M of the magnetized elements of the rotor 310 is twenty, the number N of the stator cores 321 of stator 320 is fifteen. The twenty magnetized elements of the rotor 310 are arranged in the circumferential direction at an angular distance of 18 degrees. The fifteen stator cores 321 of the stator 320 are arranged in the circumferential direction at an angular distance of 24 degrees. In this case, the U-phase coil has five stator coils. Similarly, each of the V-phase coil and the W-phase coil has five stator coils.

Figure 10:
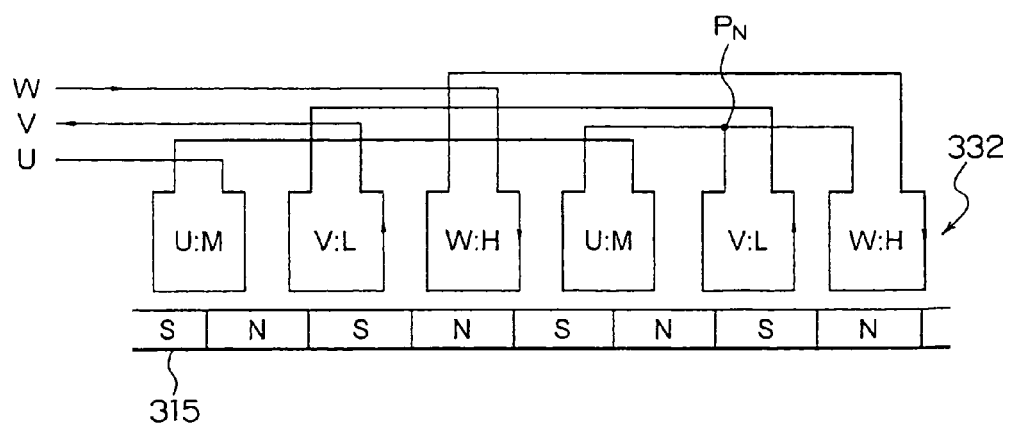
FIG. 10 illustrates a relationship between a ring-shaped permanent magnet of a rotor and the three-phase coils of a stator.

FIG. 10 illustrates a part of the DD motor 300. In the example being illustrated, the DD motor 300 comprises the rotor 310 having twenty magnetized elements and the stator 320 having fifteen stator cores 321. FIG. 10 illustrates only the part of the DD motor 300, that is, a part of eight magnetized elements and of six stator cores. In FIG. 10, the three-phase coils of U-phase, V-phase, an W-phase are merely depicted U, V, and W, respectively.

FIG. 10 illustrates a state similar to that illustrated in FIG. 9. That is, the U-phase coil is put into the "M" state, the V-phase coil is put into the "L" state, and the W-phase coil is put into the "H" state.

Figure 11:
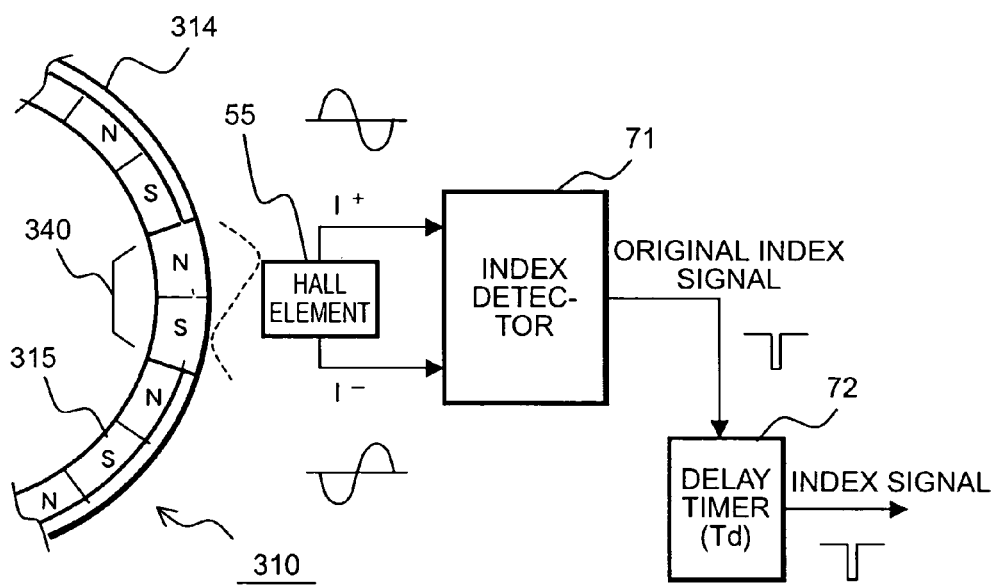
FIG. 11 is a diagram schematically showing a conventional index signal generator.

Referring to FIG. 11, the description will proceed to a conventional index signal generator which is disclosed in U.S. Pat. No. 6,429,618 issued to the present co-inventors. The index signal generator comprises the index detection Hall element 55, an index detector 71, and a delay timer 72. The index signal generator is for generating an index signal every the rotor 310 of the direct-drive motor 300 rotates.

The illustrated rotor 310 is in disk-shape with thickness and is provided with the index detection magnet 340 on the peripheral surface of the rotor 310, as shown in FIG. 11. The index detection magnet 340 is arranged to be exposed to the outside of the rotor 310, and has positive (north) and negative (south) poles which are arranged along a tangential direction of the disk-shape of the rotor 310.

The index detection Hall element 55 is located at a predetermined position that is a position outside of the rotor 310. The predetermined position is determined in consideration of a detecting ability of the index detection Hall element 55 and magnetic force of the index detection magnet 340 so that the index detection Hall element 55 can detect the change of magnetic flux suitably. In this example, the index detection Hal element 55 is supplied with the outer electric field by a reference voltage supplier (not shown) and a Hall bias supplier (not shown), in order to produce the Hall voltage in accordance with Hall effect. For example, the voltage level supplied by the reference voltage supplier is 2.5V, while the other voltage level supplied by Hall bias supplier is 1V. In this case, the index detection Hall element 55 is supplied with the outer voltage of 1.5V.

Under the condition, when the rotor 310 rotates and the index detection magnet 340 passes in front of the index detection Hall element 55, the magnetic flux detected by the index detection Hall element 55 changes depending upon the passing index detection magnet 340. As the result, Hall effect occurs at the index detection Hall element 55. The index detection Hall element 55 delivers to the index detector 71 the Hall voltage influenced by the occurring Hall effect.

As described above, the positive (north) and negative (south) poles of the index detection magnet 340 are arranged along the tangential direction of the disk-shape of the rotor 310. This causes the Hall voltage, namely the change of the magnetic flux, to have the cross point to a boundary between a plus region and a minus region of the change of the magnetic flux when the poles of the index detection magnet 340 passing in front of the index detection Hall element 55 are changed from one to another.

Figure 12:
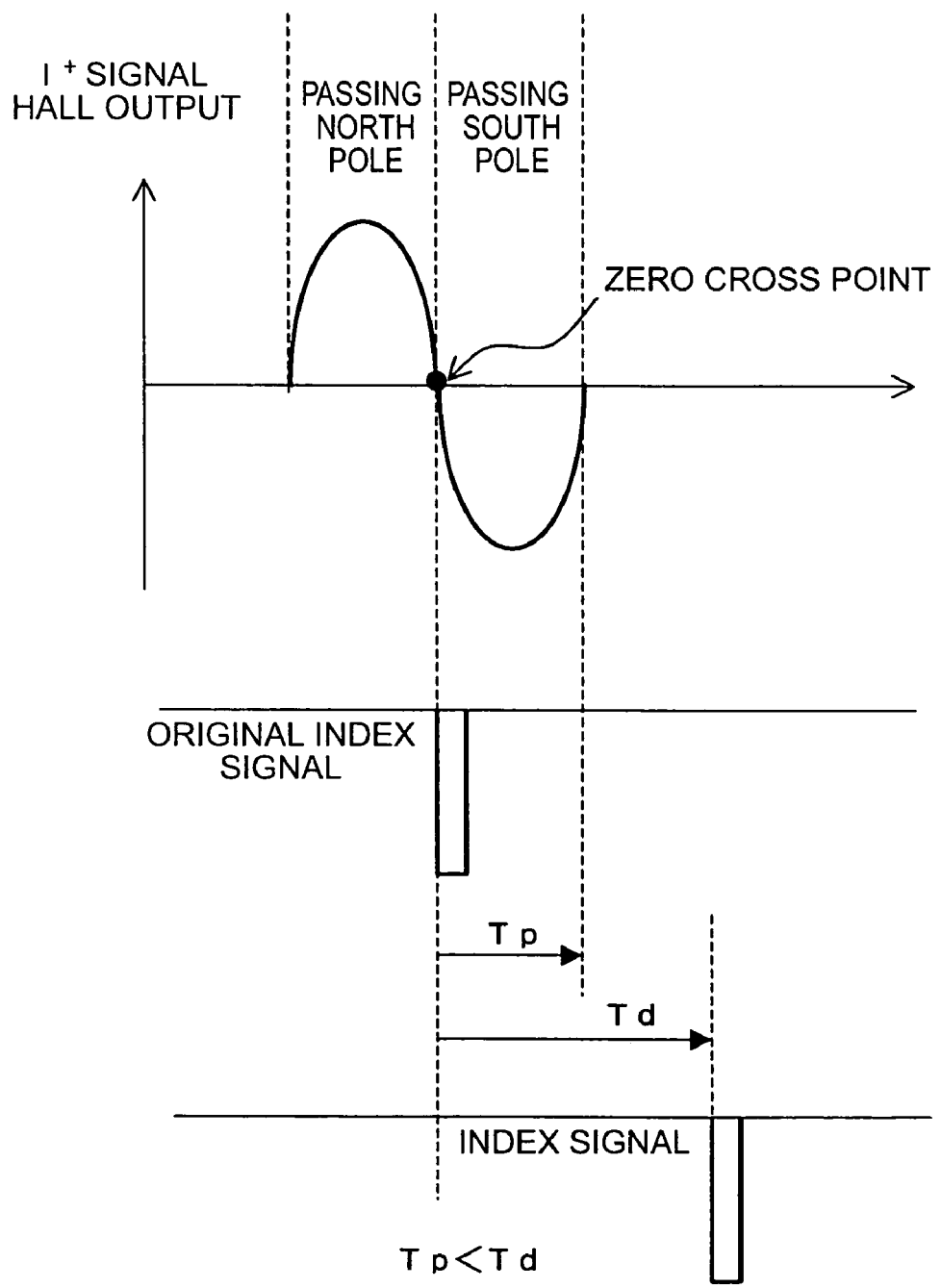
FIG. 12 is a graph showing a change of Hall voltage, an original index signal, and an index signal in the conventional index signal generator.

In this example, the index detection magnet 340 is arranged so that the poles of the index detection magnet 340 passing in front of the index diction Hall element 55 are changed from the negative (south) pole to the positive (north) pole. As the negative pole of the index detection magnet 340 approaches the index detection Hall element 55, the magnetic flux detected by the index detection Hall element 55 increases. When the center of the negative pole faces to the center of the index detection Hall element 55, the detected magnetic flux become maximum. After that, the detected magnetic flux decreases. The change of the magnetic flux has the cross point (zero cross point) when the passing poles of the index detection magnet 340 are changed from the negative pole to the positive pole. The magnetic flux decreases until the center of the positive pole faces to the center of the index detection Hall element 55, and then the magnetic flux increases. As shown in FIG. 11, the index detection Hall element 55 produces two types of the Hall voltage signals, one of which is non-reverse signal (I$^+$) while the remaining one of which is reverse signal (I$^-$). For the sake of clarity, former type (I$^+$) of the Hall voltage signal is shown in FIG. 12.

The index detector 71 monitors the Hall voltage signals I$^+$ and I$^-$. That is, the index detector 71 detects the change of magnetic flux that effects on the index detection Hall element 55. The index detector 71 produces an original index signal at the time when the cross point of the change of the magnetic flux is detected (See FIG. 12). The index detector 71 may comprise a comparator having positive and negative input terminals which are given the Hall voltage signals I$^+$ and I$^-$, respectively. In this case, the comparator of the index detector 71 outputs a low level pulse as the original index signal at the moment when the Hall voltage signal I$^+$ is not larger than the other Hall voltage signal I$^-$.

In order to ensure the hardware compatibility, the original index signal is delayed by the predetermined delay time, as mentioned above. To delay the original index signal, the delay timer 72 is used in the index signal generator of this example. The delay timer 72 has a delay time Td longer than a half period Tp of the Hall voltage signal I$^+$.

The change of the Hall voltage has the zero cross point to the boundary between plus and minus regions when the poles of the index detection magnet 340 passing in front of the index detection Hall element 55 are changed from the negative (south) pole to the positive (north) pole. The zero cross point is independent of the temperature fluctuation, even if the amplitude of the Hall voltage changes depending upon the temperature fluctuation. The index signal is generated on the basis of the zero cross point so as to be stable.

However, a reduction in costs due to a cut of parts and reinforcement of operation stability are desired in the flexible disk drive, as mentioned in the preamble of the instant specification.

Figure 13:
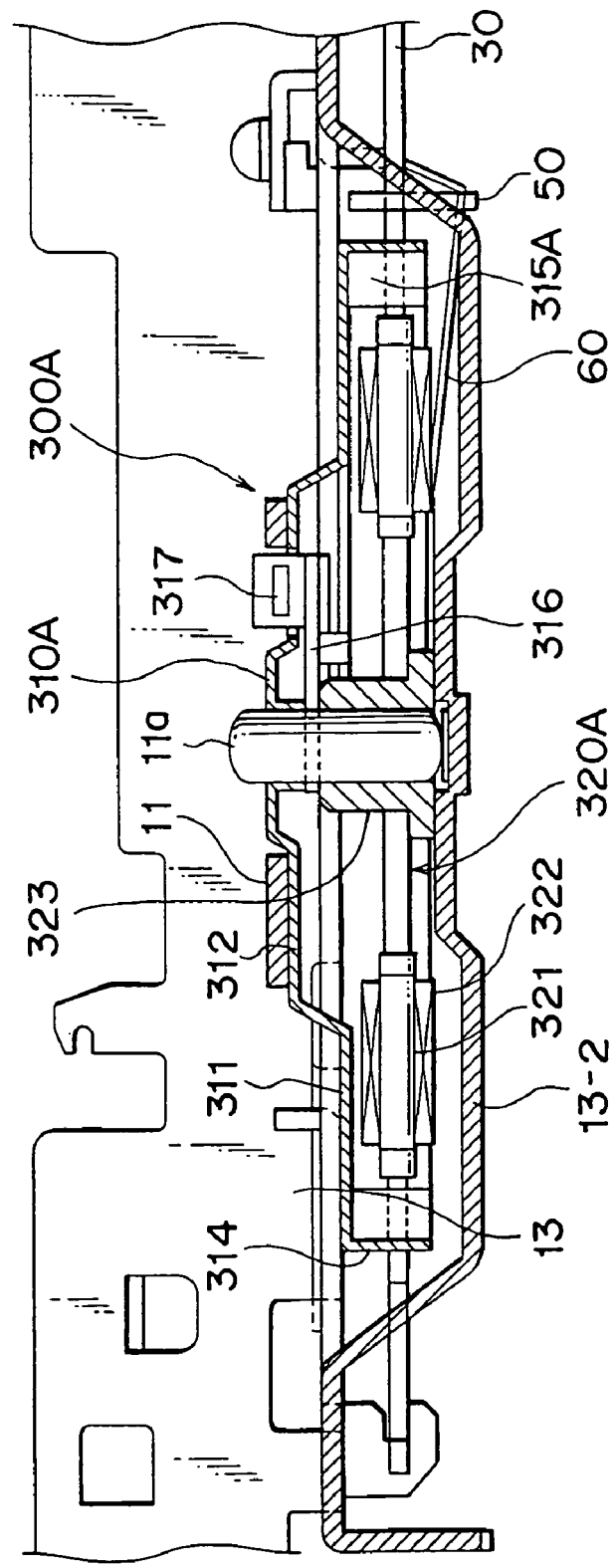
FIG. 13 is a sectional view showing a direct-drive motor (spindle motor) provided with an index signal generator according to a first embodiment of this invention.

Referring to FIG. 13, the description will proceed to a DD motor (spindle motor) 300A provided with an index signal generator according to a first embodiment of this invention. The DD motor 300A is similar in structure and operation of the DD motor 300 illustrated in FIG. 5 except that the index detection Hall element 55 and the exclusive index detection magnet 340 are omitted and the rotor and the stator are modified from those illustrated in FIG. 5 in the manner which will presently become clear. Therefore, the stator and the rotor are depicted at 320A and 310A, respectively.

Figure 14:
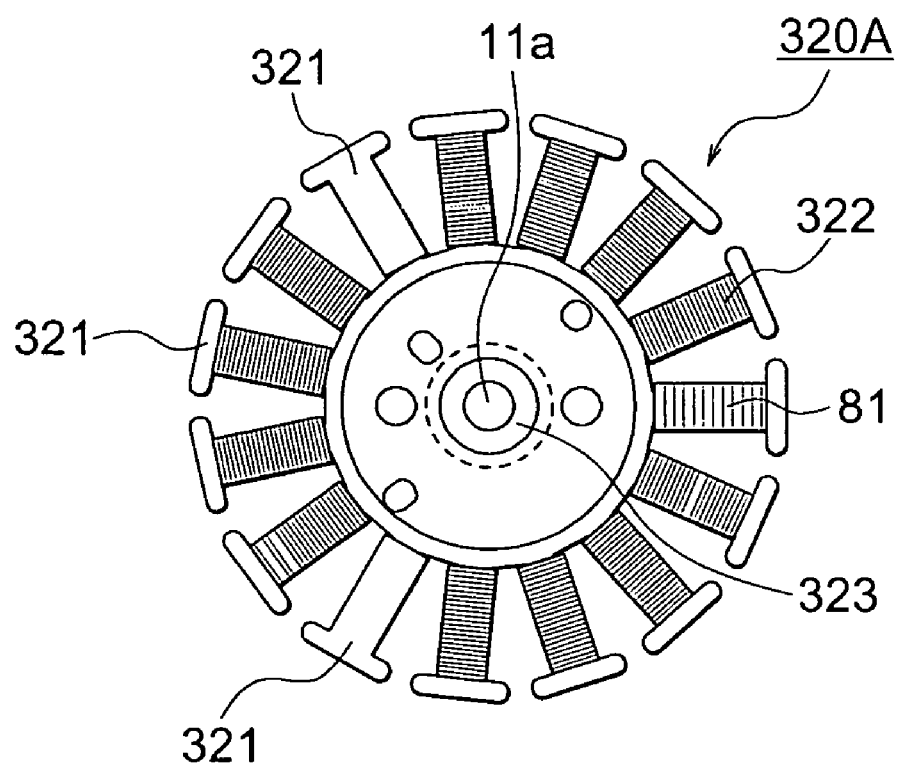
FIG. 14 is a plan view showing a stator for use in the direct-drive motor illustrated in FIG. 13.

Referring to FIG. 14, the stator 320A comprises a core assembly having fifteen stator cores 321, twelve stator or driving coils 322, and the center metal 323. The fifteen stator cores 321 are disposed in one another in the first equal angular intervals and extend radially outwardly from the center axis of the rotation shaft (rotation axis) 11a. The twelve driving coils 322 are wound around the fifteen stator cores 321 except for particular three cores which are arranged in equal angular intervals of 120 degrees. That is, there are the particular three cores each of which no driving coil is wound around. An index detection coil 81 is wound around a specific one of the particular three cores. In the manner which will later be described, the index detection coil 81 is for detecting variations of magnetic force generated by the ring-shaped permanent magnet to produce a detected signal.

As shown in FIG. 14, no coil is wound around remaining two of the particular three cores. The remaining two of the particular three cores are arranged at an angular space of 120 degrees to the specific one of the particular three cores. Although the twelve driving coils 322 are wound around twelve of the fifteen poles 321, fourteen driving coils may be wound around fourteen of the fifteen stator cores 321 except for the specific one of the particular three cores. However, to keep balance of supply of three-phase driving currents, it is desirable to wind the remaining two of the particular three cores with no coil. In order to keep weight balance, two coils supplied with no driving current may be wound around the remaining two of the particular three cores. The two coils are similar to the index detection coil 81.

As an optimum structure, for convenience' sake, each of the index detection coil 81 and the above-mentioned two coils may be similar in structure to each driving coil and only connection structure may be changed.

Among the twelve driving coils, each of the U-phase coil, the V-phase coil, and the W-phase coil has four stator coils.

Figure 15:
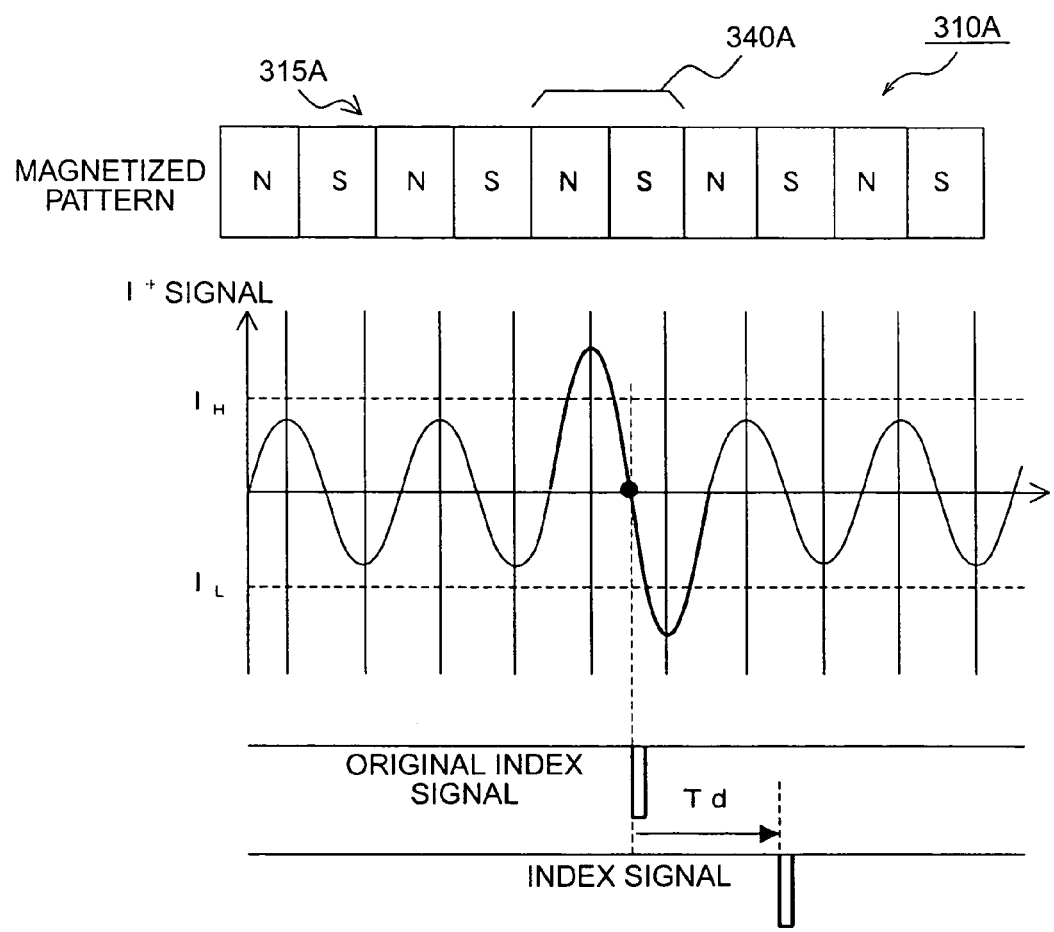
FIG. 15 is a time chart of describing the index signal generator according to the first embodiment of this invention.

Referring to FIG. 15, the rotor 310A is similar in structure and operation of the rotor 310 illustrated in FIG. 5 except that the ring-shaped permanent magnet is modified from that illustrated in FIG. 5. Therefore, the ring-shaped permanent magnet is depicted at 315A.

The ring-shaped permanent magnet 315A has twenty magnetized elements as described above. Among the twenty magnetized elements of the ring-shaped permanent magnet 315A, two successive magnetized elements are used as an index detection magnet 340A as shown in FIG. 15. In other words, the index detection magnet 340A consists of two adjacent magnetized elements of the north pole and the south pole. The index detection magnet 340A has magnetic force stronger than those of the remaining eighteen magnetic elements of the ring-shaped permanent magnet 315A.

The index detection coil 81 detects variation of the magnetic force generated by the ring-shaped permanent magnet 315A to produce a detected signal. As shown in FIG. 15, the detected signal has a zero cross point because the magnetized elements of the ring-shaped permanent magnet 315A pass in front of the index detection coil 81.

In this example, the index detection magnet 340A is arranged so that the magnetic poles of the index detection magnet 340A passing in front of the index detection coil 81 are changed from the north pole to the south pole. As the north pole of the index detection magnet 340A approaches the index detection coil 81, the detected signal gradually increases with increment of detected magnetic flux. The detected signal has a peak after the elapse of time delay when the center of the north pole face to the index detection coil 81. After that, the detected signal gradually decreases. The detected signal has the zero cross point after elapse of time delay when the passing magnetic poles of the index detection magnet 340A are changed from the north pole to the south pole. Thereafter, with shifting of the south pole, the detected signal indicates variation opposite in a case of the north pole.

Although the detected signal of the index detection coil 81 consists of a non-reverse signal (I+) and a reverse signal (I−), only the non-reverse signal (I+) is shown in FIG. 15 in order to facilitate the understanding of this invention. The reverse signal (I−) is a signal obtained by reversing the non-reverse signal (I+).

As shown in FIG. 15, a predetermined threshold value $I_H$ is preliminarily set in a middle position between an output signal level corresponding to the eighteen magnetized elements of the ring-shaped permanent magnet 315A and an output signal level corresponding to the index detection magnet 340A. In other words, the predetermined threshold value $I_H$ is higher than the output signal level corresponding to the remaining ones of the M magnetized elements and is lower than the output signal level corresponding to the index detection magnet 340A. Accordingly, the original index signal is generated when the detected signal reaches the zero cross point immediately after the detected signal exceeds the threshold value $I_H$ and the index signal is stably generated after the elapse of the predetermined delay time Td. The predetermined delay time Td is longer than a half period of the detected signal and is shorter than one period of the detected signal.

Figure 16:
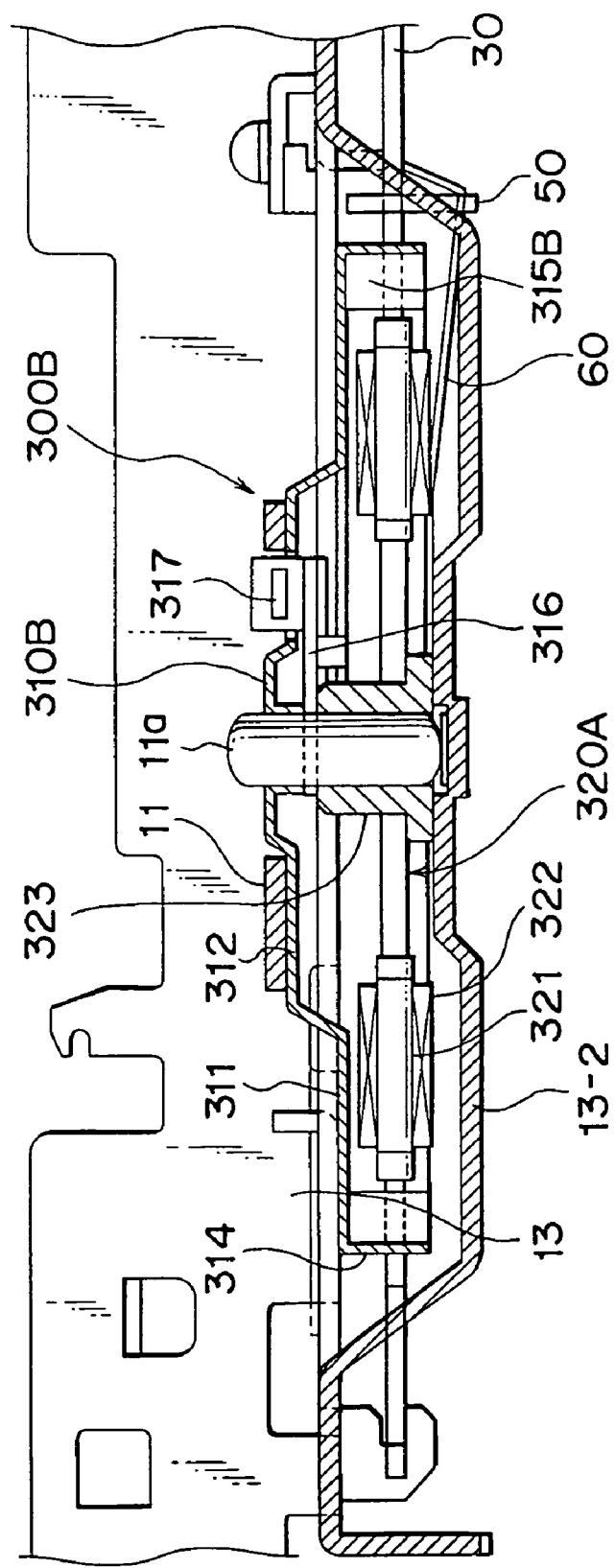
FIG. 16 is a sectional view showing a direct-drive motor (spindle motor) provided with an index signal generator according to a second embodiment of this invention.

Referring to FIG. 16, the description will proceed to a DD motor (spindle motor) 300B provided with an index signal generator according to a second embodiment of this invention. The DD motor 300B is similar in structure and operation of the DD motor 300A illustrated in FIG. 13 except that the rotor is modified from that illustrated in FIG. 13 in the manner which will presently become clear. Therefore, the rotor is depicted at 310B.

Figure 17:
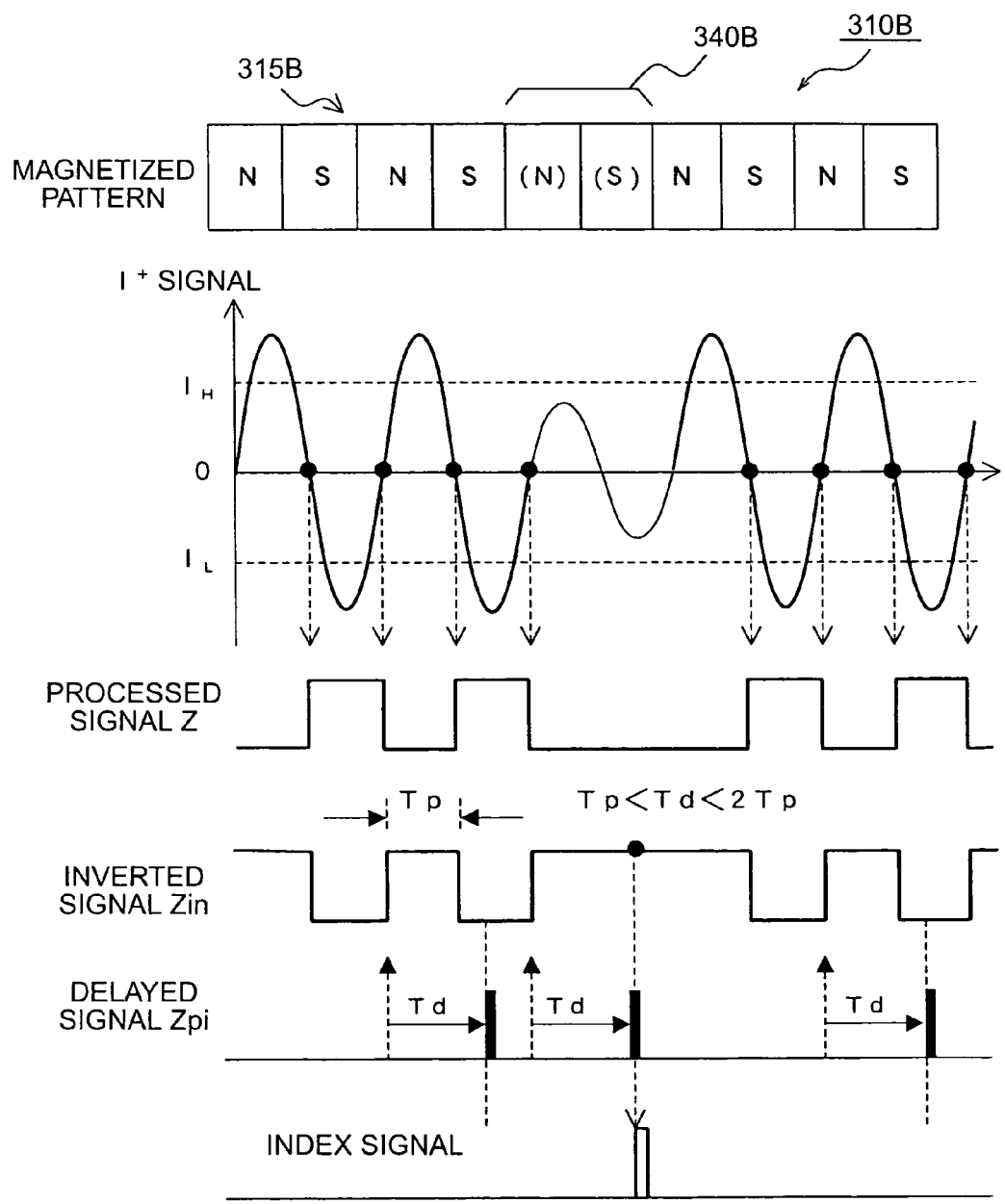
FIG. 17 is a time chart of describing the index signal generator according to the second embodiment of this invention.

Referring to FIG. 17, the rotor 310B is similar in structure and operation of the rotor 310A illustrated in FIG. 15 except that the ring-shaped permanent magnet is modified from that illustrated in FIG. 15. Therefore, the ring-shaped permanent magnet is depicted at 315B.

The ring-shaped permanent magnet 315B has twenty magnetized elements as described above. Among the twenty magnetized elements of the ring-shaped permanent magnet 315B, two successive magnetized elements are used as an index detection magnet 340B as shown in FIG. 17. In other words, the index detection magnet 340B consists of two adjacent magnetized elements of the north pole and the south pole. The index detection magnet 340B has magnetic force weaker than those of the remaining eighteen magnetized elements of the ring-shaped permanent magnet 315B.

Figure 18:
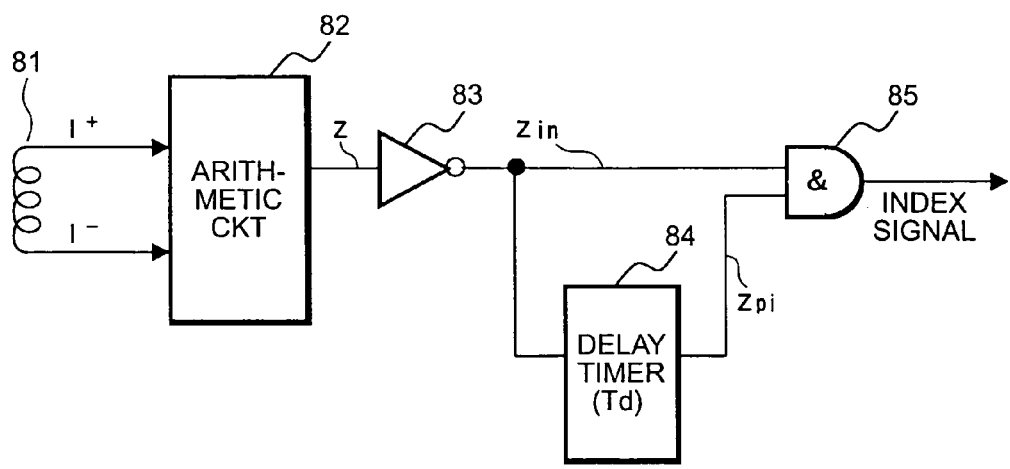
FIG. 18 is a block diagram showing the index signal generator according to the second embodiment of this invention.

Referring to FIG. 18 in addition to FIG. 17, the description will proceed to the index signal generator according to the second embodiment of this invention. The illustrated index signal generator comprises an arithmetic circuit 82, a NOT circuit 83, a delay timer 84, and an AND circuit 85.

The arithmetic circuit 82 is supplied with the non-reverse signal (I+) and the reverse signal (I−) from the index detection coil 81. The arithmetic circuit 82 processes the non-reverse signal (I+) and the reverse signal (I−) to produce a processed signal Z. That is, the arithmetic circuit 82 serves as a processing arrangement for processing the detected signal to produce the processed signal Z. The processed signal Z has a leading edge at a zero cross point of the non-reverse signal (I+) immediately after the non-reverse signal (I+) exceeds a predetermined positive threshold value $I_H$. The processed signal Z has a trailing edge at a zero cross point of the non-reverse signal (I+) immediately after the non-reverse signal (I+) lower than a predetermined negative threshold value $I_L$. Inasmuch as the index detection magnet 340B has weaken magnetic force, the non-reverse signal (I+) does not exceed the predetermined positive threshold value $I_H$ when the index detection magnet 340B face to the index diction coil 81. Therefore, the processed signal Z has no edge interval which is thee times as long as the half period Tp of the detected signal, as shown in FIG. 17.

The NOT circuit 83 inverts the processed signal Z to produce an inverted signal Zin. That is, the NOT circuit 83 serves as an inverting arrangement for inverting the processed signal Z to produce the inverted signal Zin. The inverted signal Zin is supplied to the delay timer 84 and the AND circuit 85. The delay timer 84 delays the leading edge of the inverted signal Zin for the predetermined delay time Td to produce a delayed signal Zpi. The delay time Td is shorter than one period 2Tp of the detected signal and is longer than the half period Tp of the detected signal. For instance, it will be assumed that the rotor 310B rotates at 300 r.p.m. and has one period 2Tp of 20 milliseconds. In this event, the predetermined delay time Td is, for example, 15 milliseconds. The AND circuit 85 ANDs the inverted signal Zin and the delayed signal Zpi to produce an ANDed signal as the index signal.

Accordingly, the index signal is generated corresponding to a part of the index detection magnet 340B.

Figure 19:
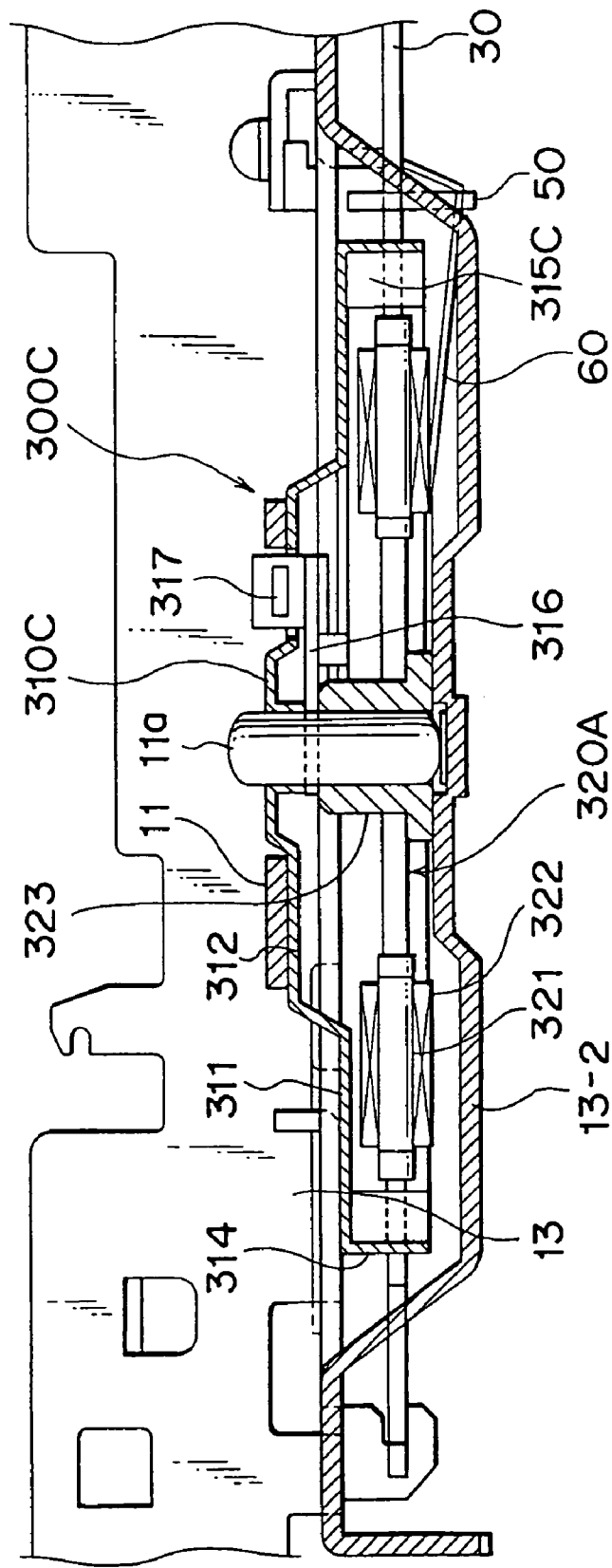
FIG. 19 is a sectional view showing a direct-drive motor (spindle motor) provided with an index signal generator according to a third embodiment of this invention.

Referring to FIG. 19, the description will proceed to a DD motor (spindle motor) 300C provided with an index signal generator according to a third embodiment of this invention. The DD motor 300C is similar in structure and operation of the DD motor 300B illustrated in FIG. 16 except that the rotor is modified from that illustrated in FIG. 16 in the manner which will presently become clear. Therefore, the rotor is depicted at 310C.

Figure 20:
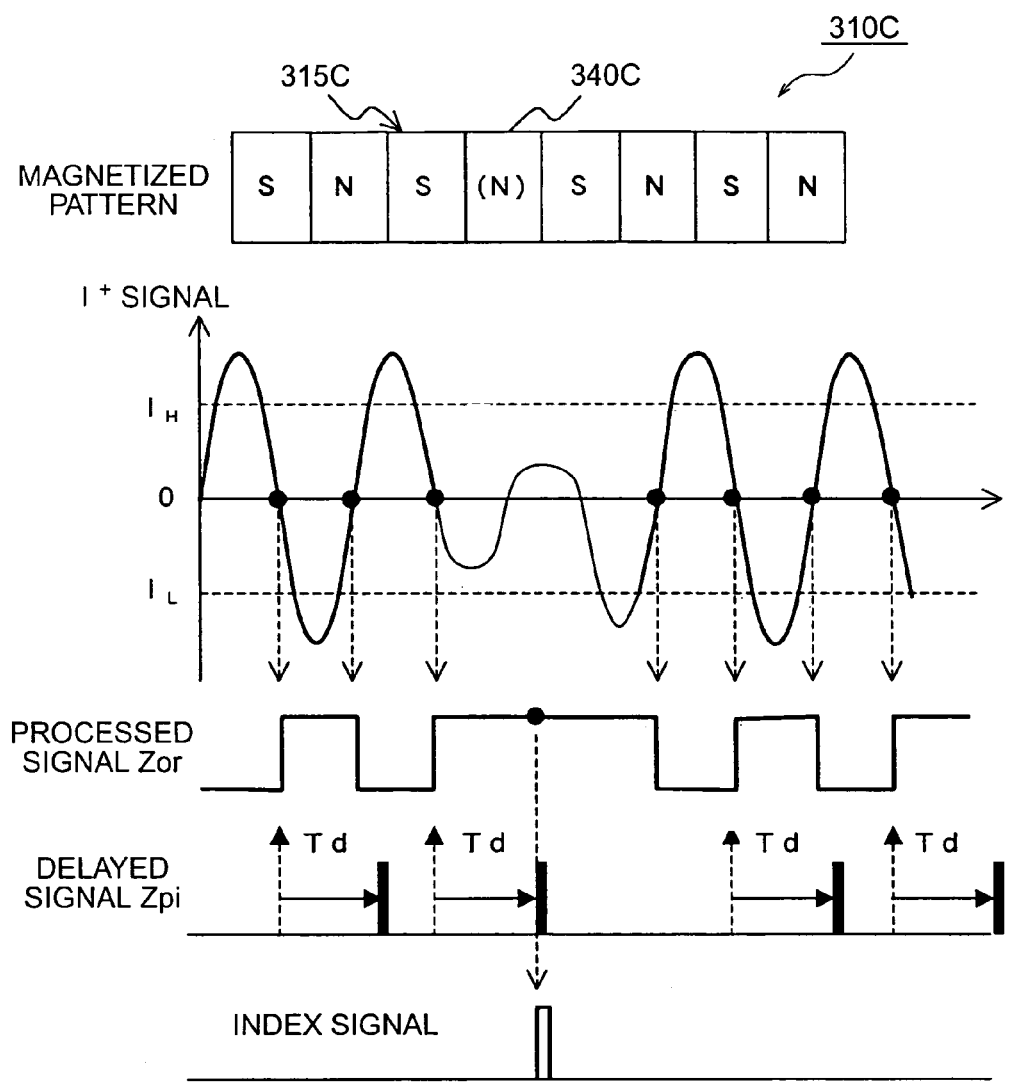
FIG. 20 is a time chart of describing the index signal generator according to the third embodiment of this invention.

Referring to FIG. 20, the rotor 310C is similar in structure and operation of the rotor 310B illustrated in FIG. 17 except that the ring-shaped permanent magnet is modified from that illustrated in FIG. 17. Therefore, the ring-shaped permanent magnet is depicted at 315C.

The ring-shaped permanent magnet 315C has twenty magnetized elements as described above. Among the twenty magnetized elements of the ring-shaped permanent magnet 315C, only one magnetized element is used as an index detection magnet 340C, as shown in FIG. 20. In other words, the index detection magnet 340C consists of only one magnetized element selected from the north pole N and the south pole S. In the example being illustrated, the index detection magnet 340C consists of the north pole N. The index detection magnet 340C has magnetic force weaker than those of the remaining nineteen magnetized elements of the ring-shaped permanent magnet 315C. Inasmuch as the index detection magnet 340C has weaken magnetic force, two adjacent magnetized elements have magnetic force weaker than those of the remaining sixteen magnetized elements of the ring-shaped permanent magnet 315C.

Figure 21:
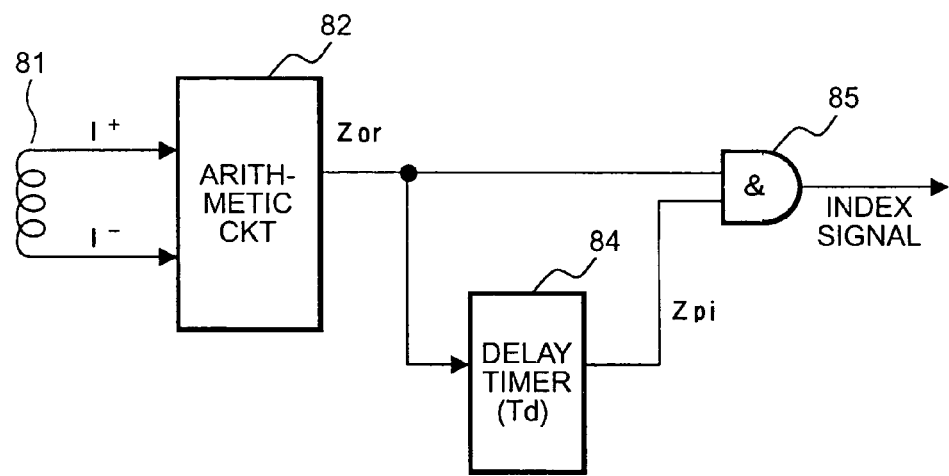
FIG. 21 is a block diagram showing the index signal generator according to the third embodiment of this invention.

Referring to FIG. 21 in addition to FIG. 20, the description will proceed to the index signal generator according to the third embodiment of this invention. The illustrated index signal generator comprises an arithmetic circuit 82, the delay timer 84, and the AND circuit 85.

The arithmetic circuit 82 processes the non-reverse signal (I$^+$) and the reverse signal (I$^-$) to produce a processed signal Zor. That is, the arithmetic circuit 82 serves as a processing arrangement for processing the detected signal to produce the processed signal Zor. The processed signal Zor has a leading edge at a zero cross point of the non-reverse signal (I$^+$) immediately after the non-reverse signal (I$^+$) exceeds the predetermined positive threshold value $I_H$. The processed signal Zor has a trailing edge at a zero cross point of the non-reverse signal (I$^+$) immediately after the non-reverse signal (I+) lowers than the predetermined negative threshold value $I_L$. The processed signal Zor has a pulse width which is three times as long as the half period Tp of the detected signal when the index detection magnet 340C passes the index detection coil 81. The delay timer 84 delays the leading edge of the processed signal Zor for the predetermined delay time Td to produce a delayed signal Zpi. The AND circuit 85 ANDs the processed signal Zor and the delayed signal Zpi to produce an ANDed signal as the index signal.

Accordingly, the index signal is generated corresponding to a part of the index detection magnet 340C.

Although the index detection magnet 340C has weaken magnetic force, the index detection magnet 340C may have no magnetic force.

Figure 22:
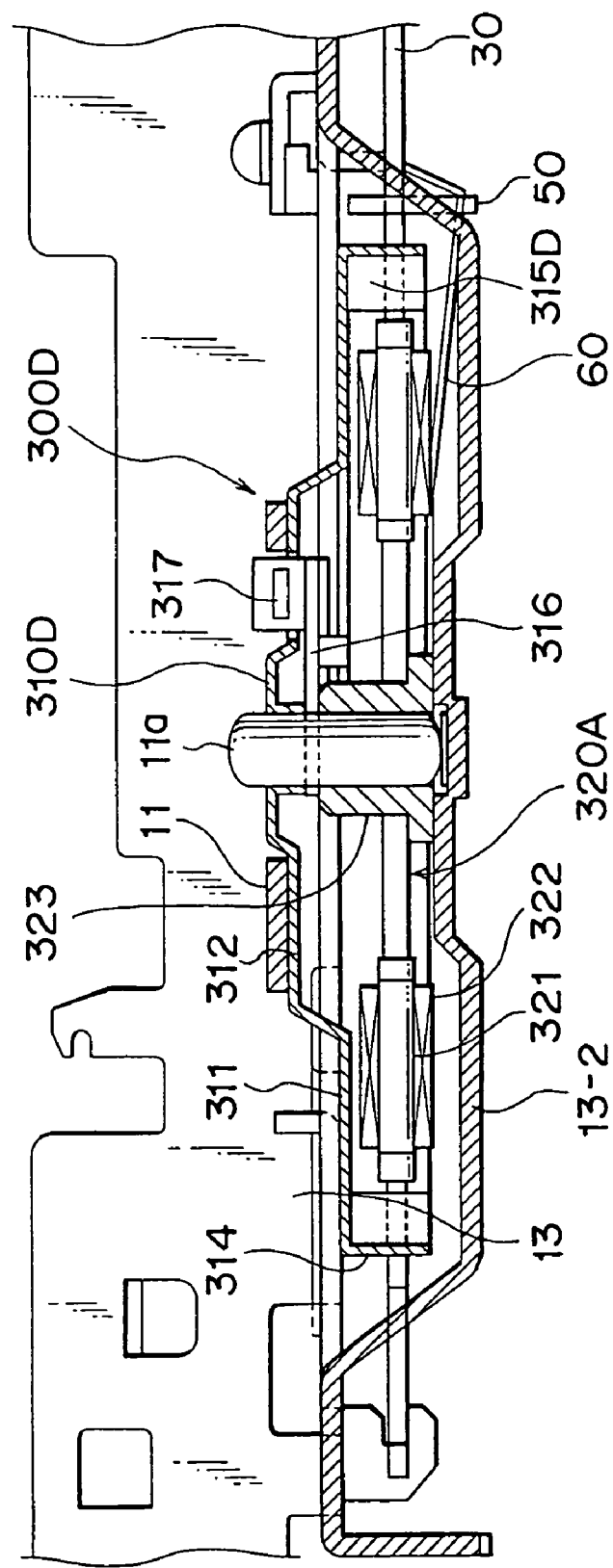
FIG. 22 is a sectional view showing a direct-drive motor (spindle motor) provided with an index signal generator according to a fourth embodiment of this invention.

Referring to FIG. 22, the description will proceed to a DD motor (spindle motor) 300D provided with an index signal generator according to a fourth embodiment of this invention. The DD motor 300D is similar in structure and operation of the DD motor 300B illustrated in FIG. 16 except that the rotor is modified from that illustrated in FIG. 16 in the manner which will presently become clear. Therefore, the rotor is depicted at 310D.

Figure 23:
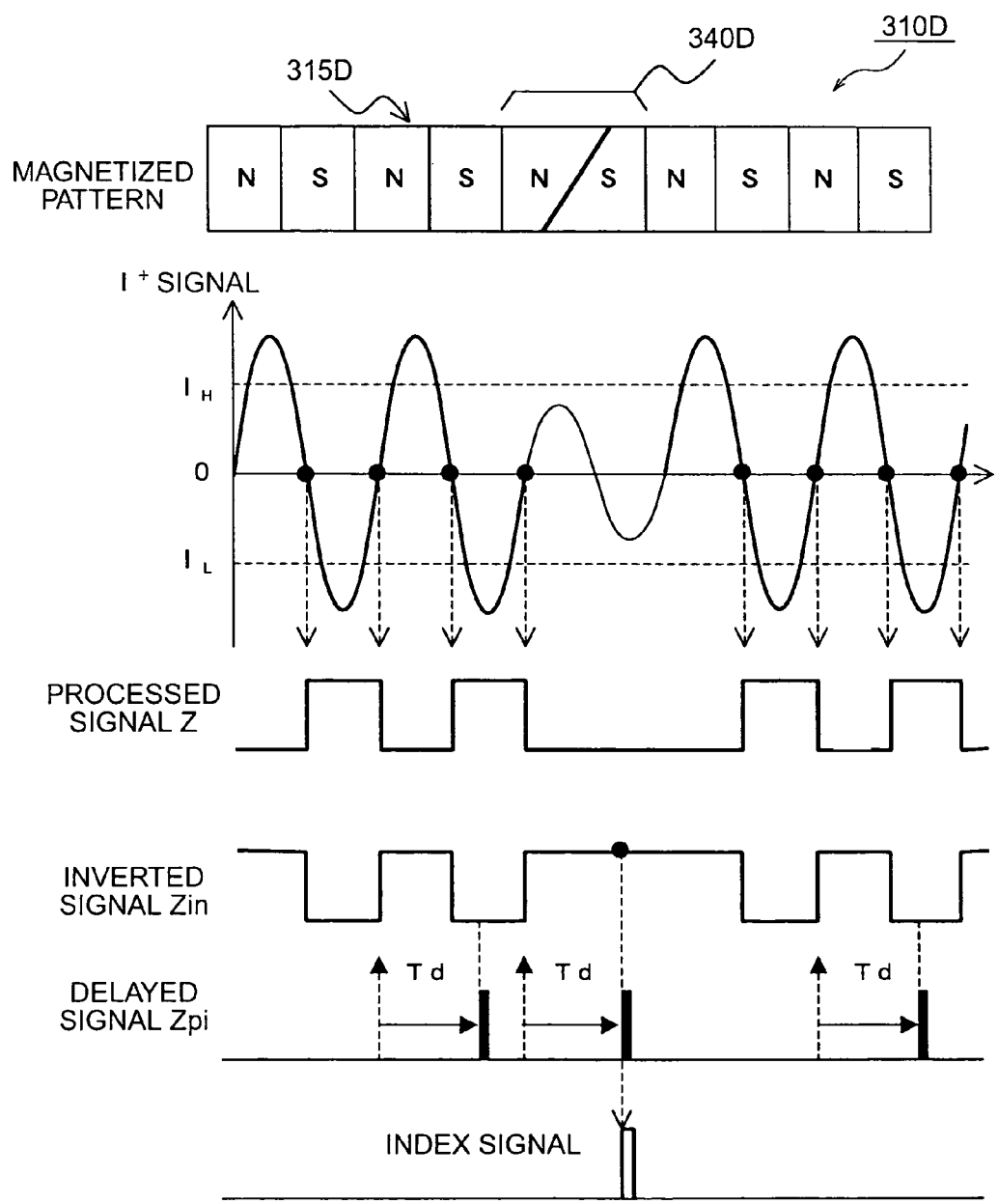
FIG. 23 is a time chart of describing the index signal generator according to the fourth embodiment of this invention.

Referring to FIG. 23, the rotor 310D is similar in structure and operation of the rotor 310B illustrated in FIG. 17 except that the ring-shaped permanent magnet is modified from that illustrated in FIG. 17. Therefore, the ring-shaped permanent magnet is depicted at 315D.

The ring-shaped permanent magnet 315D has twenty magnetized elements as described above. Among the twenty magnetized elements of the ring-shaped permanent magnet 315B, two successive magnetized elements are used as an index detection magnet 340D as shown in FIG. 23. That is, the index detection magnet 340D consists of two adjacent magnetized elements of the north pole and the south pole. The index detection magnet 340D has magnetic force weaker than those of the remaining eighteen magnetized elements of the ring-shaped permanent magnet 315D. Specifically, adjacent two in the remaining eighteen magnetized elements of the ring-shaped permanent magnet 315D are in contact with each other at a contact surface perpendicular to a moving direction of the rotor 310D, as shown in FIG. 23. The two adjacent magnetized elements of the index detection magnet 340D are in contact with each other at a contact surface inclined to the moving direction of the rotor 310D, as shown in FIG. 23. As a result, the index detection magnet 340D has magnetic force weaker than those of the remaining eighteen magnetized elements of the ring-shaped permanent magnet 315D.

Inasmuch as the index signal generator according to the fourth embodiment of this invention is similar in structure and operation of that illustrated in FIGS. 17 and 18, description thereof is omitted.

While this invention has thus far been described in conjunction with several embodiments thereof, it is to be understood that modifications will be apparent to those skilled in the art without departing from the sprit of the invention.

What is claimed is:

1. A method of generating an index signal for use in a direct-drive motor having a rotation axis and comprising a stator and a rotor, said stator comprising N stator cores which extend radially outwardly from the rotation axis and which are disposed in one another in first equal angular intervals, where N represents a first positive integer which is multiple of three and which is not less than six, said rotor comprising a ring-shaped permanent magnet faced to an outer periphery surface of said stator with a predetermined gap, said ring-shaped permanent magnet comprising M magnetized elements which are arranged in second equal angular intervals, where M represents a second positive integer which is not less than four, said M magnetized elements alternating equally between a north pole and a south pole, said method comprising the steps of:

winding (N−3) driving coils for rotatably driving said rotor around said N stator cores except for particular three cores which are arranged in equal angular intervals of 120 degrees;

using a particular at least one of said M magnetized elements as an index detection magnet, said index detection magnet having magnetic force which is different from those in remaining ones of said M magnetized elements;

winding an index detection coil around a specific one of said particular three cores, said index detection coil being for detecting variations of the magnetic force generated by said ring-shaped permanent magnet to produce a detected signal; and generating the index signal on the basis of said detected signal.

2. The method as claimed in claim 1, wherein said index detection magnet has magnetic force stronger than those of the remaining ones of said M magnetized elements.

3. The method as claimed in claim 2, wherein said index detection magnet consists of two adjacent magnetized elements of the north pole and the south pole.

4. The method as claimed in claim 3, wherein said generating step comprises the sub-steps of:

producing an original index signal at a zero cross point of the detected signal immediately after said detected signal exceeds a predetermined threshold value which is higher than an output signal level corresponding to the remaining ones of said M magnetized elements and which is lower than an output signal level corresponding to said index detection magnet; and delaying the original index signal for a predetermined delay time to produce a delayed index signal as said index signal, the predetermined delay time being longer than a half period of the detected signal and being shorter than one period of the detected signal.

5. The method as claimed in claim 1, wherein said index detection magnet has magnetic force weaker than those of the remaining ones of said M magnetized elements.

6. The method as claimed in claim 5, wherein said index detection magnet has no magnetic force.

7. The method as claimed in claim 5, wherein said index detection magnet consists of two adjacent magnetized elements of the north pole and the south pole.

8. The method as claimed in claim 7, wherein said generating step comprises the sub-steps of:

processing the detected signal to produce a processed signal, the processed signal having a leading edge at a zero cross point of the detected signal immediately after the detected signal exceeds a predetermined positive threshold value and a trailing edge at a zero cross point of the detected signal immediately after the detected signal lowers than a predetermined negative threshold value;

inverting the processed signal to produce an inverted signal;

delaying a leading edge of the inverted signal for a predetermined delay time to produce a delayed signal, the predetermined delay time being longer than a half period of the detected signal and being shorter than one period of the detected signal; and ANDing the inverted signal and the delayed signal to produce an ANDed signal as the index signal.

9. The method as claimed in claim 5, wherein said index detection magnet consists of only one magnetized element selected from the north pole and the south pole.

10. The method as claimed in claim 9, wherein said generating step comprises the sub-steps of:

processing the detected signal to produce a processed signal, the processed signal having a leading edge at a zero cross point of the detected signal immediately after the detected signal exceeds a predetermined positive threshold value and a trailing edge at a zero cross point of the detected signal immediately after the detected signal lowers than a predetermined negative threshold value;

delaying a leading edge of the processed signal for a predetermined delay time to produce a delayed signal, the predetermined delay time being longer than a half period of the detected signal and being shorter than one period of the detected signal; and ANDing the processed signal and the delayed signal to produce an ANDed signal as the index signal.

11. The method as claimed in claim 1, wherein further comprising the step of winding two coils around said particular three cores except for the specific one thereof, said two coils being supplied with no driving current.

12. An index signal generator for generating an index signal for use a direct-drive motor having a rotation axis and comprising a stator and a rotor:

said stator comprising N stator cores which extend radially outwardly from the rotation axis and which are disposed in one another in first equal angular intervals, where N represents a first positive integer which is multiple of three and which is not less than six, and (N−3) driving coils wound around said N stator cores except for particular three cores which are arranged in equal angular intervals of 120 degrees;

said rotor comprising a ring-shaped permanent magnet faced to an outer periphery surface of said stator with a predetermined gap, said ring-shaped permanent magnet comprising M magnetized elements which are arranged in second equal angular intervals, where M represents a second positive integer which is not less than four, said M magnetized elements alternating equally between a north pole and a south pole;

said index signal generator comprising:

an index detection magnet being a particular at least one of said M magnetized elements, said index detection magnet having magnetic force which is different from those in remaining ones of said M magnetized elements;

an index detection coil, wound around a specific one of said particular three cores, for detecting variations of the magnetic force generated by said ring-shaped permanent magnet to produce a detected signal; and generating means for generating the index signal on the basis of said detected signal.

13. The index signal generator as claimed in claim 12, wherein said index detection magnet has magnetic force stronger than those of the remaining ones of said M magnetized elements.

14. The index signal generator as claimed in claim 13, wherein said index detection magnet consists of two adjacent magnetized elements of the north pole and the south pole.

15. The index signal generator as claimed in claim 14, wherein said generating means comprises:

producing means for producing an original index signal at a zero cross point of the detected signal immediately after said detected signal exceeds a predetermined threshold value which is higher than an output signal level corresponding to the remaining ones of said M magnetized elements and which is lower than an output signal level corresponding to said index detection magnet; and delaying means for delaying the original index signal for a predetermined delay time to produce a delayed index signal as said index signal, the predetermined delay time being longer than a half period of the detected signal and being shorter than one period of the detected signal.

16. The index signal generator as claimed in claim 12, wherein said index detection magnet has magnetic force weaker than those of the remaining ones of said M magnetized elements.

17. The index signal generator as claimed in claim 16, wherein said index detection magnet has no magnetic force.

18. The index signal generator as claimed in claim 16, wherein said index detection magnet consists of two adjacent magnetized elements of the north pole and the south pole.

19. The index signal generator as claimed in claim 18, wherein said generating means comprises:

processing means for processing the detected signal to produce a processed signal, the processed signal having a leading edge at a zero cross point of the detected signal immediately after the detected signal exceeds a predetermined positive threshold value and a trailing edge at a zero cross point of the detected signal immediately after the detected signal lowers than a predetermined negative threshold value;

inverting means for inverting the processed signal to produce an inverted signal;

delaying means for delaying a leading edge of the inverted signal for a predetermined delay time to produce a delayed signal, the predetermined delay time being longer than a half period of the detected signal and being shorter than one period of the detected signal; and an AND circuit for ANDing the inverted signal and the delayed signal to produce an ANDed signal as the index signal.

20. The index signal generator as claimed in claim 18, wherein the two adjacent magnetized elements of said index detection magnet are in contact with each other at a contact surface inclined to a moving direction of said rotor, adjacent two in the remaining magnetized elements of said ring-shaped permanent magnet are in contact with each other at a contact surface perpendicular to the moving direction of said rotor.

21. The index signal generator as claimed in claim 16, wherein said index detection magnet consists of only one magnetized element selected from the north pole and the south pole.

22. The index signal generator as claimed in claim 21, wherein said generating means comprises:

processing means for processing the detected signal to produce a processed signal, the processed signal having a leading edge at a zero cross point of the detected signal immediately after the detected signal exceeds a predetermined positive threshold value and a trailing edge at a zero cross point of the detected signal immediately after the detected signal lowers than a predetermined negative threshold value;

delaying means for delaying a leading edge of the processed signal for a predetermined delay time to produce a delayed signal, the predetermined delay time being longer than a half period of the detected signal and being shorter than one period of the detected signal; and an AND circuit for ANDing the processed signal and the delayed signal to produce an ANDed signal as the index signal.

23. The index signal generator as claimed in claim 12, wherein further comprises two coils wound around said particular three cores except for the specific one thereof, said two coils being supplied with no driving current.

* * * * *